(12) United States Patent
Chu et al.

(10) Patent No.: US 7,230,727 B2
(45) Date of Patent: Jun. 12, 2007

(54) SYSTEM FOR SENSING AN ABSOLUTE POSITION IN TWO DIMENSIONS USING A TARGET PATTERN

(75) Inventors: David C. Chu, Palo Alto, CA (US); Evan R. Whitney, Saratoga, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 146 days.

(21) Appl. No.: 11/112,623

(22) Filed: Apr. 22, 2005

(65) Prior Publication Data

US 2006/0238776 A1    Oct. 26, 2006

(51) Int. Cl.
    *G01B 11/14* (2006.01)
(52) U.S. Cl. .................. 356/616; 356/420; 356/421
(58) Field of Classification Search ............. 356/616, 356/401–425; 382/312–313; 235/460, 462.1, 235/494; 250/226, 559.01
See application file for complete search history.

(56) References Cited

U.S. PATENT DOCUMENTS

| | | | |
|---|---|---|---|
| 6,781,694 B2 | 8/2004 | Nahum et al. | |
| 2002/0179826 A1* | 12/2002 | Laberge et al. | 250/231.18 |
| 2004/0218181 A1* | 11/2004 | Jones et al. | 356/401 |
| 2006/0022061 A1* | 2/2006 | MacKenzie | 235/494 |

* cited by examiner

*Primary Examiner*—Gregory J. Toatley, Jr.
*Assistant Examiner*—Tri Ton

(57) ABSTRACT

A system for sensing an absolute position in two dimensions includes a target having a two-dimensional target pattern. A sensor captures an image of a first subset of the target pattern. A controller generates a first image vector representing summations of rows of pixel values from the image, and a second image vector representing summations of columns of pixel values from the image. The controller is configured to determine an absolute two-dimensional position of the first subset with respect to an origin of the target pattern based on the first and the second image vectors and a plurality of target vectors that represent the target pattern.

29 Claims, 13 Drawing Sheets

1502A

| | SUM | NUM | w | g | b | λw | λg | λb | |
|---|---|---|---|---|---|---|---|---|---|
| I | 16.90 | 2 | 0 | 2 | 0 | 2 | -2 | 0 | UNMATCHED |
| II | 43.71 | 3 | 3 | 0 | 0 | -3 | 3 | 0 | UNMATCHED |
| III | 23.10 | 3 | 0 | 3 | 0 | 0 | -3 | 3 | MATCHED |
| IV | 4.41 | 3 | 0 | 0 | 3 | 0 | 3 | -3 | MATCHED |
| V | 40.03 | 5 | 0 | 5 | 0 | 0 | 0 | 0 | |

1504 — 1. GREY:

| | SUM | NUM | w | g | b | λw | λg | λb | |
|---|---|---|---|---|---|---|---|---|---|
| g= | 8.01 | 1 | 0 | 1 | 0 | 0 | 0 | 0 | |

1502B — 2. EVEN UP:

| | SUM | NUM | w | g | b | λw | λg | λb | |
|---|---|---|---|---|---|---|---|---|---|
| I | (0.88) | 2 | 0 | (0) | 0 | 2 | -2 | 0 | I even |
| II | (19.69) | 3 | 3 | (3) | 0 | -3 | 3 | 0 | II even |
| III | (-0.92) | 3 | 0 | (0) | 0 | 0 | -3 | 3 | III even |
| IV | (-19.61) | 3 | 0 | (-3) | 3 | 0 | 3 | -3 | IV even |

1502C — 3. MATCHING:

| | SUM | NUM | w | g | b | λw | λg | λb | |
|---|---|---|---|---|---|---|---|---|---|
| I | (1.32) | (3) | 0 | 0 | 0 | (3) | (-3) | 0 | MATCHED |
| II | 19.69 | 3 | 3 | -3 | 0 | -3 | 3 | 0 | |
| III | -0.92 | 3 | 0 | 0 | 0 | 0 | -3 | 3 | MATCHED |
| IV | -19.61 | 3 | 0 | -3 | 3 | 0 | 3 | -3 | |

1502D — 4. ISOLATING:

| | SUM | NUM | w | g | b | λw | λg | λb | |
|---|---|---|---|---|---|---|---|---|---|
| I | 1.3 | 3 | 0 | 0 | 0 | 3 | -3 | 0 | |
| II | (21.0) | 3 | 3 | -3 | 0 | (0) | (0) | 0 | ISOLATED |
| III | -0.9 | 3 | 0 | 0 | 0 | 0 | -3 | 3 | |
| IV | (-20.5) | 3 | 0 | -3 | 3 | 0 | (0) | (0) | ISOLATED |

1506 — 5. LAMBDA:

| λ = | 0.054 |
|---|---|

1508 — 6. LIGHT INTENSITIES:

| w= | 15.07 |
|---|---|
| b= | 1.22 |

Fig. 15

SYSTEM FOR SENSING AN ABSOLUTE POSITION IN TWO DIMENSIONS USING A TARGET PATTERN

BACKGROUND

In numerous applications, there is a need to precisely measure the position of an object. For example, many manufacturing processes require precise positioning of a moving stage. Several techniques for determining the position of a moving object have been developed. Some of these techniques are discussed below.

In some prior art optical mouse devices, a random two-dimensional pattern consisting of the surface irregularity of a mouse pad is captured continuously by a digital camera into sequential N×N pixel-arrays. Memory depth is at least one past the current array. Nine two-dimensional correlations (e.g., one step in each direction: left, right, up, down, both directions of two diagonals, plus "no-change") are computed. By observing the maximum of the nine correlations, the direction of the mouse travel can be determined. By interpolation of the correlation values, the length of travel can be estimated to a fraction of a sensor pixel. This method for determining location is incremental and not absolute, and travel between frames typically cannot exceed one pixel, or errors may result.

In some other prior art applications, specific targets are used instead of random targets. Some one-dimensional incremental encoders, for example, use two gratings in quadrature of a one-dimensional sinusoid to produce two continuous image grey-scales. Calibration of the known intensity profile of the scale enables one to interpolate to less than one cycle, and counting the cycles in the proper travel direction made possible by two signals in quadrature allow determination of both coarse location and fine location. This approach, very commonly used in industry, is also an incremental measurement technique just as with the mouse, and subject to the same limitations. To use one-dimension encoder technology for two dimension applications generally requires cumbersome mechanical stage stacking.

In some other prior art applications, to reduce the need for making a two-dimensional correlation for every N×N pattern over the entire target for two-dimensional absolute position encoding, position labeling codes have been used. The codes are periodically interleaved into a random or periodic fine grey-scale background. The (yet unknown) position code or codes are first identified and extracted from the image, and their contents are then deciphered. The location of the code within the image is then found more accurately, and by inference, the image location is established.

Several prior art methods interpolate between discrete correlations by observing the analog shape of the correlation functions. Cross-correlation of the target pattern reduces the accuracy of this approach and must be carefully controlled.

Prior art systems for determining position, such as those described above, are typically not very efficient, require relatively large amounts of memory, and the targets used in some of these systems are complex to make and use.

SUMMARY

Disclosed herein is a system for sensing an absolute position in two dimensions. The system includes a target having a two-dimensional target pattern. A sensor captures an image of a first subset of the target pattern. A controller generates a first image vector representing summations of rows of pixel values from the image, and a second image vector representing summations of columns of pixel values from the image. The controller is configured to determine an absolute two-dimensional position of the first subset with respect to an origin of the target pattern based on the first and the second image vectors and a plurality of target vectors that represent the target pattern.

BRIEF DESCRIPTION OF THE DRAWINGS

FIG. 15 is a diagram illustrating the determination of a fractional pixel location for an example windage vector using the method shown in FIG. 14 according to the present teachings.

DETAILED DESCRIPTION

In the following Detailed Description, reference is made to the accompanying drawings, which form a part hereof, and in which is shown specific and illustrative embodiments according to the present teachings. It is to be understood that other embodiments may be utilized and structural or logical changes may be made without departing from the scope of the appended claims. The following Detailed Description, therefore, is not to be taken in a limiting sense, and the scope of the present invention is defined by the appended claims.

A specific embodiment according to the present teachings provides a method and apparatus for determining an absolute two-dimensional location or position of an object based on a digital image of a binary or ternary target formed on the object. In one embodiment, a sensor captures an image of a portion of the target, and the location of the image within the target is determined in two dimensions to a fractional-pixel resolution. In a specific embodiment, the position determination is made using a block regression technique. In one embodiment, a first process is performed to make a coarse position determination (e.g., within one pixel), and then a second process is performed to make a fine position determination (e.g., within a fraction of one pixel). In one embodiment, the second process is a block-regression process that refines the absolute position determination down to a fraction of a pixel by mathematically best-fitting a solution over a set of redundant data and equations.

I. System

Figure 1:
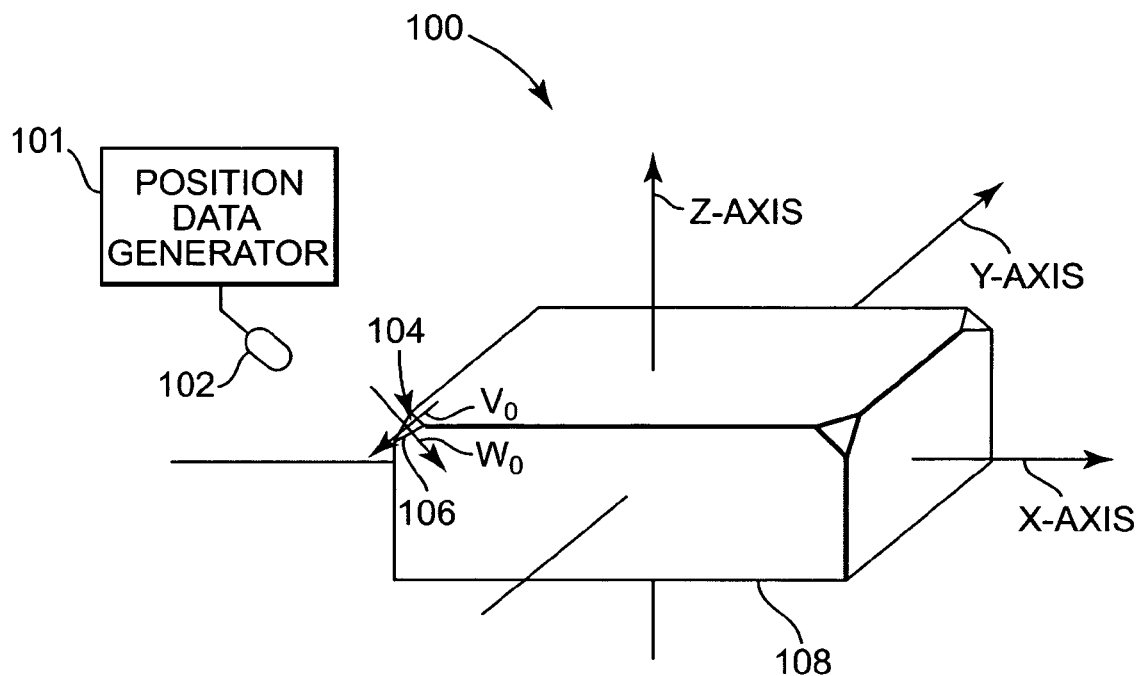
FIG. 1 is a simplified diagram illustrating a system for finding the "home" position of a stage to six degrees of freedom in one embodiment according to the present teachings.

FIG. 1 is a simplified diagram illustrating a system 100 for finding an absolute two-dimensional location or position of an object 108 according to one embodiment of the present invention. In the illustrated embodiment, object 108 is a movable stage in a manufacturing process seeking its "home" position to a high degree of precision to six degrees of freedom. Object 108 is also referred to herein as stage 108. It will be understood by persons of ordinary skill in the art that the present teachings are useful to other types of systems and processes in which absolute two-dimensional position sensing is desired.

Figure 3:
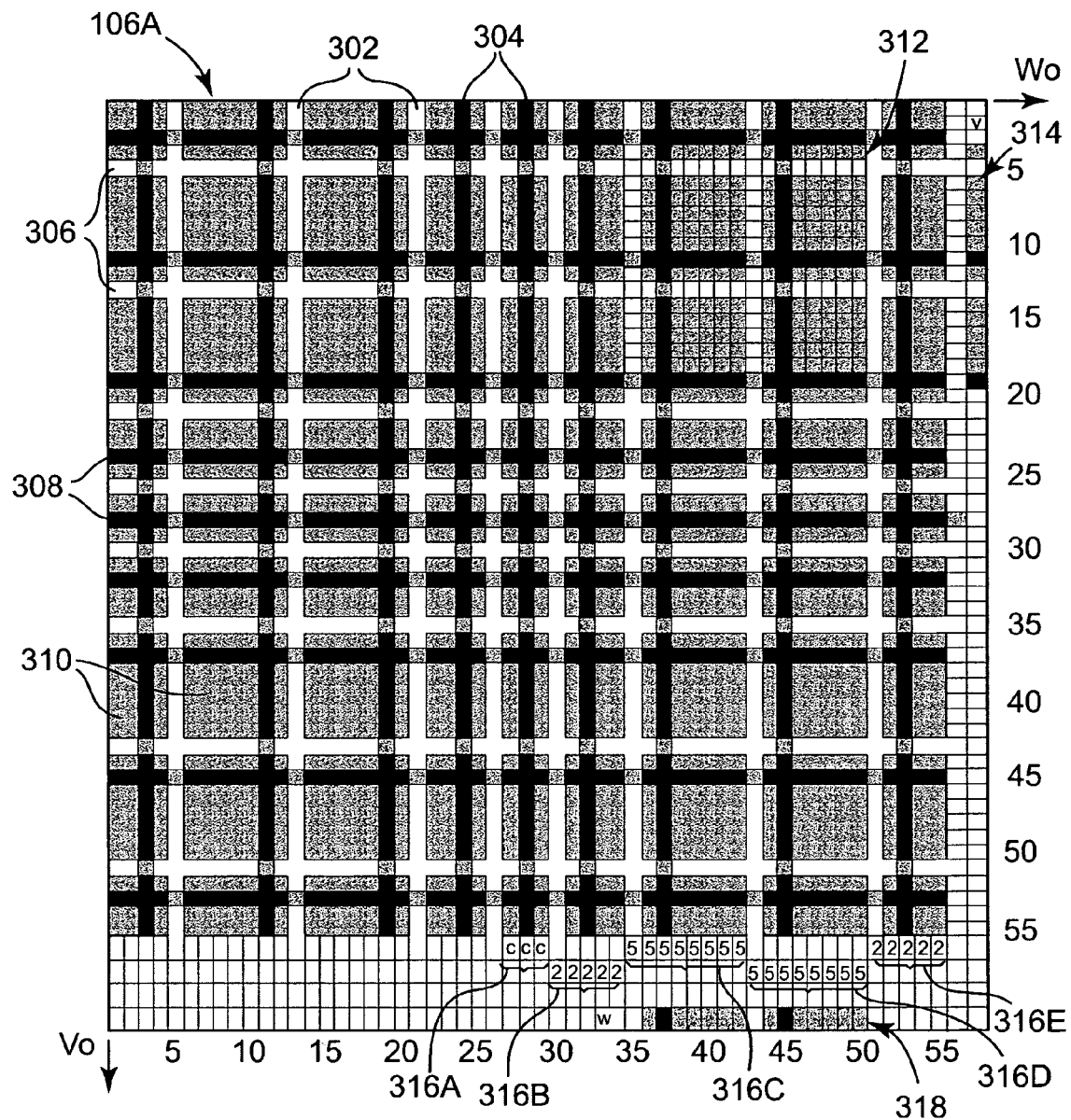
FIG. 3 is a diagram illustrating a 55×55-pixel 3-greyscale (ternary) target according to the present teachings.

System 100 includes position data generator (also referred to as a controller) 101 and sensor 102. Stage 108 includes a target plane or target surface 104 located on one corner of stage 108. The area of target plane 104 is exaggerated for the purpose of simplifying the viewing of the target plane 104. Target plane 104 is defined in two dimensions by a first axis $V_O$ (elevation) and a second axis $W_O$ (windage), which is perpendicular to the first axis. A target pattern 106 is formed on target plane 104. Various embodiments of the target pattern 106 are shown in FIGS. 3–5, and are described in further detail below with reference to these Figures.

In operation according to one embodiment, sensor 102 illuminates and captures images of portions of the target 106. The captured images are output from sensor 102 to position data generator 101. Position data generator 101 processes the captured images of the target 106 and generates absolute two-dimensional target position data based on the captured images. The target position data represents the absolute position of the imaged portion of the target 106 with respect to an origin of the target 106 in both the windage and elevation dimensions. Position data generator 101 then determines a two-dimensional absolute lateral position of the target plane-area based on the two-dimensional target position data.

In another embodiment, additional sensors 102 and targets 106 may be used to measure two-dimensional lateral positions of three target surface positions producing three sets of windage and elevation data for a total of six numbers. Linear processing of the six numbers determines the position of the stage 108 in six degrees of freedom (i.e., translation along three perpendicular axes (X-axis, Y-axis, and Z-axis) as well as rotation around the three perpendicular axes (Roll, Pitch, and Yaw).

In yet another embodiment according to the present teachings, a single target 106 is placed on the bottom surface, for example, of stage 108, and is used by system 100 to identify a two-dimensional absolute position of stage 100.

Figure 2:
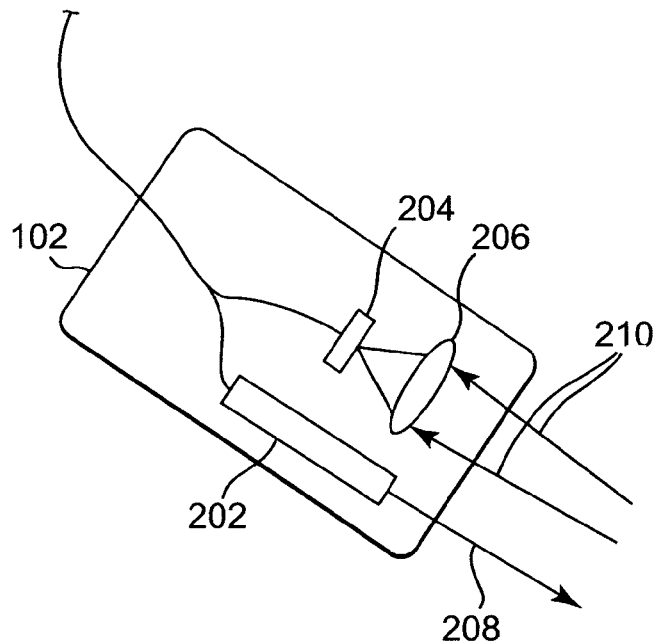
FIG. 2 is a simplified diagram illustrating a sensor according to the present teachings.

FIG. 2 is a simplified diagram illustrating a sensor 102 according to the present teachings. In the illustrated embodiment, sensor 102 includes a light source 202, an image sensor chip 204, and optics 206. In one embodiment, light source 202 is a light emitting diode (LED). In another embodiment, sensor 102 does not include a light source 202. In one form of the invention, image sensor chip 204 is a complementary metal-oxide semiconductor (CMOS) image sensor. In one embodiment, optics 206 include one or more optic lenses. Light source 202 outputs light 208 that illuminates target 106. Reflected light 210 from the target 106 is directed by optics 206 onto image sensor chip 204. Based on the received light, image sensor chip 204 generates a digital image representing a portion of the target 106, and provides the digital image to position data generator 101 for determining the current position of the target 106 (and correspondingly the stage 108) with respect to the sensor 102, or with respect to some other reference point.

II. Target

FIG. 3 is a diagram illustrating a 55×55-pixel 3-greyscale (ternary) target 106A according to one embodiment of the present teachings. Target 106A represents a first embodiment of the target 106 identified in FIG. 1. In the illustrated embodiment, target 106A has only three grey levels, which are referred to herein as white, grey, and black. The two-dimensional target 106A includes a plurality of vertical white lines 302, a plurality of vertical black lines 304, a plurality of horizontal white lines 306, and a plurality of horizontal black lines 308. The lines 302, 304, 306, and 308 extend across the entire target 106A, and are formed on a grey background 310 (represented by stipple shading) that also extends across the entire target 106A. The lines 302 and 304 are orthogonal to the lines 306 and 308 in the illustrated embodiment. To facilitate digital encoding processing including interpolation, parallel black and white lines are not immediately adjacent. In one embodiment, pixels of target 106A at line crossings are specified as follows: (1) A pixel at a black-grey crossing is made black; (2) a pixel at a white-grey crossing is made white; and (3) a pixel at a black-white crossing is made grey.

Target 106A is shown in FIG. 3 on a grid with a horizontal axis ($W_O$) that represents windage, or a horizontal direction, and a vertical axis ($V_O$) that represents elevation, or a vertical direction. The axes $W_O$ and $V_O$ begin at an origin point in the upper left corner of the target 106A, and extend orthogonally outward. In the illustrated embodiment, target 106A is symmetrical in both the $W_O$ and $V_O$ dimensions about the center of the target 106A, and the line designs in both dimensions are identical, which allows a common encoding algorithm to be used for both dimensions. A design pattern of orthogonal straight-lines as shown in FIG. 3 allows separate and independent one-dimensional position processing for the two dimensions.

In one embodiment, the spatial separations of the lines are mathematically synthesized such that any one-dimensional sequence over thirteen consecutive pixels is not duplicated. As a result, any 13×13-pixel (or larger) image of target 106A is unique. Conversely, given any 13×13-pixel (or larger) image, the location of the image within the target 106A can be determined uniquely from the pattern of straight lines. An example 16×16 image 312 captured by sensor 102 (FIG. 1) is shown in FIG. 3. Since the image 312 is larger than 13×13 pixels, the location of image 312 within target 106A can be determined from the pattern of lines. The pixels of the image 312 are vertically and horizontally aligned with the pixels of the target 106A. The upper left pixel of the image 312 is located at the fourth row and the thirty-fifth column of the grid. Thus, the position of image 312 with respect to the origin of target 106A according to one embodiment is specified as (4, 35). The pixels of image 312 may be vertically or horizontally offset from the pixels of the target 106A, such as being shifted a fraction of a pixel to the left or right, or a fraction of a pixel up or down from the position shown in FIG. 3. In such cases, the specification of the position of the image 312 will include a fractional value (e.g., 4.35, 35.60).

The center of target 106A includes three vertical columns 316A, which are labeled "ccc" on the grid. The columns 316A are nominally grey-black-grey, except at crossings with horizontal white or black lines. Immediately to the right of columns 316A are five columns 316B, which are labeled "22222" on the grid. The columns 316B are nominally white-grey-black-grey-grey, counting from the center outwards. Columns 316B are defined as a "2-period", and include a preamble of white-grey-black columns followed by two grey columns. The number of grey columns following the preamble names the period (i.e., two grey columns following the preamble constitute a 2-period). Immediately to the right of columns 316B are two sets of eight columns 316C and 316D, which are both labeled "55555555" on the grid. The columns 316C and 316D are both nominally white-grey-black-grey-grey-grey-grey-grey, counting from the center outwards. Columns 316C and 316D are both defined as "5-period", and include a preamble of white-grey-black columns followed by five grey columns. Immediately to the right of columns 316D are five columns 316E, which are labeled 22222 on the grid. The columns 316E are nominally white-grey-black-grey-grey, counting from the center outwards. Columns 316E are defined as a "2-period", and include a preamble of white-grey-black columns followed by two grey columns.

Thus, using the above notation, target 106A has a period sequence 2,5,5,2. Since the line pattern is symmetrical about the center of target 106A, and the two dimensions share the same pattern, all 55 columns and all 55 rows of target 106A are completely specified by the period sequence. Thus, every pixel in the entire 55×55 target 106A is completely specified by the concise notation 2,5,5,2.

Also shown in FIG. 3 are an elevation vector (V) 314 and a windage vector (W) 318, which both correspond to image 312. The vectors 314 and 318 are used in determining the position of image 312 as will be described in further detail below with reference to FIG. 6.

Figure 4A:
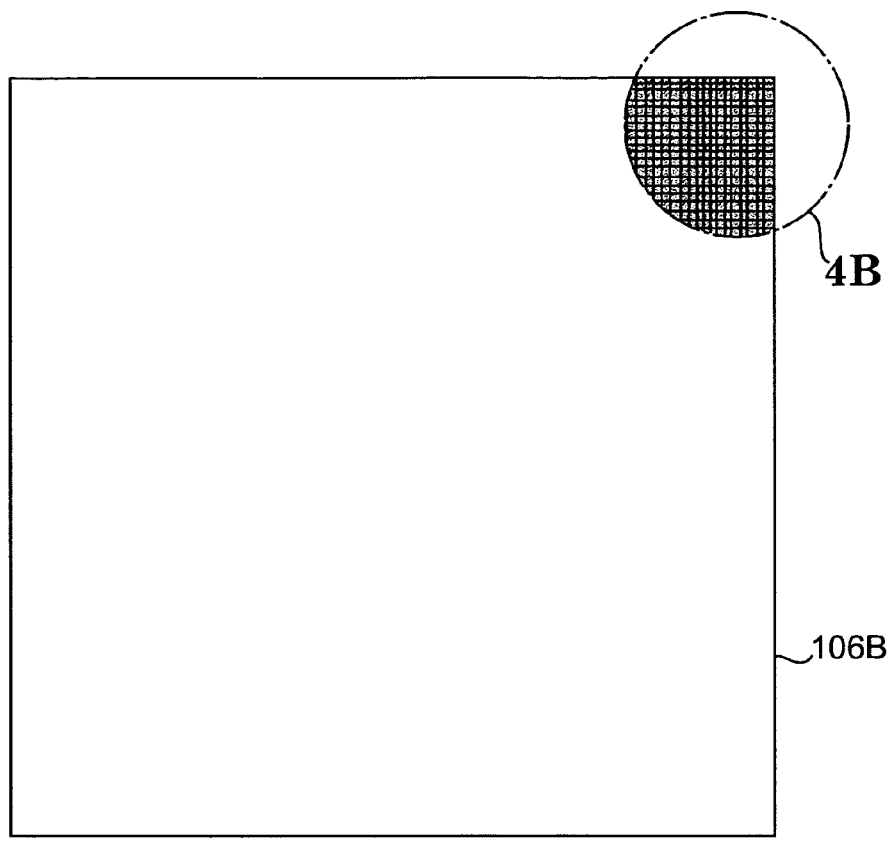
FIG. 4A is a diagram illustrating a 711×711-pixel 3-greyscale (ternary) target according to the present teachings.
Figure 4B:
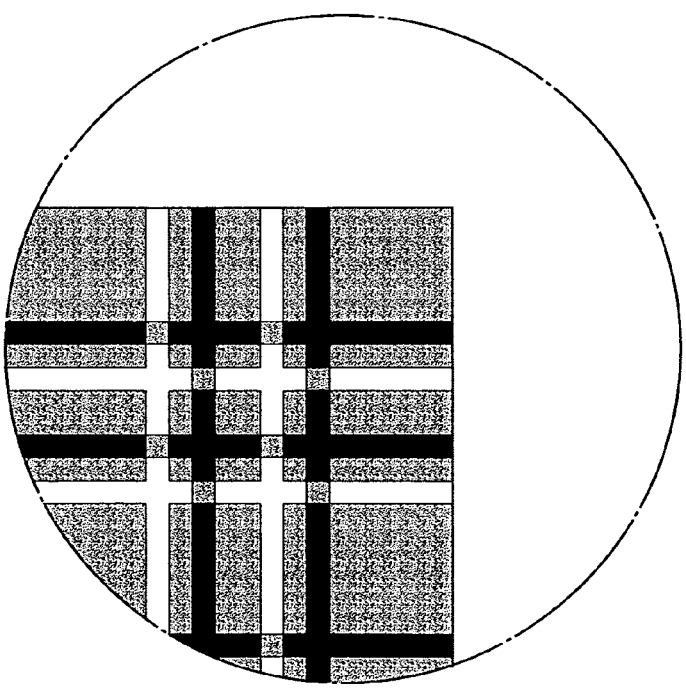
FIG. 4B is a diagram illustrating an enlarged view of the circled portion of the target shown in FIG. 4A according to the present teachings.
Figure 5:
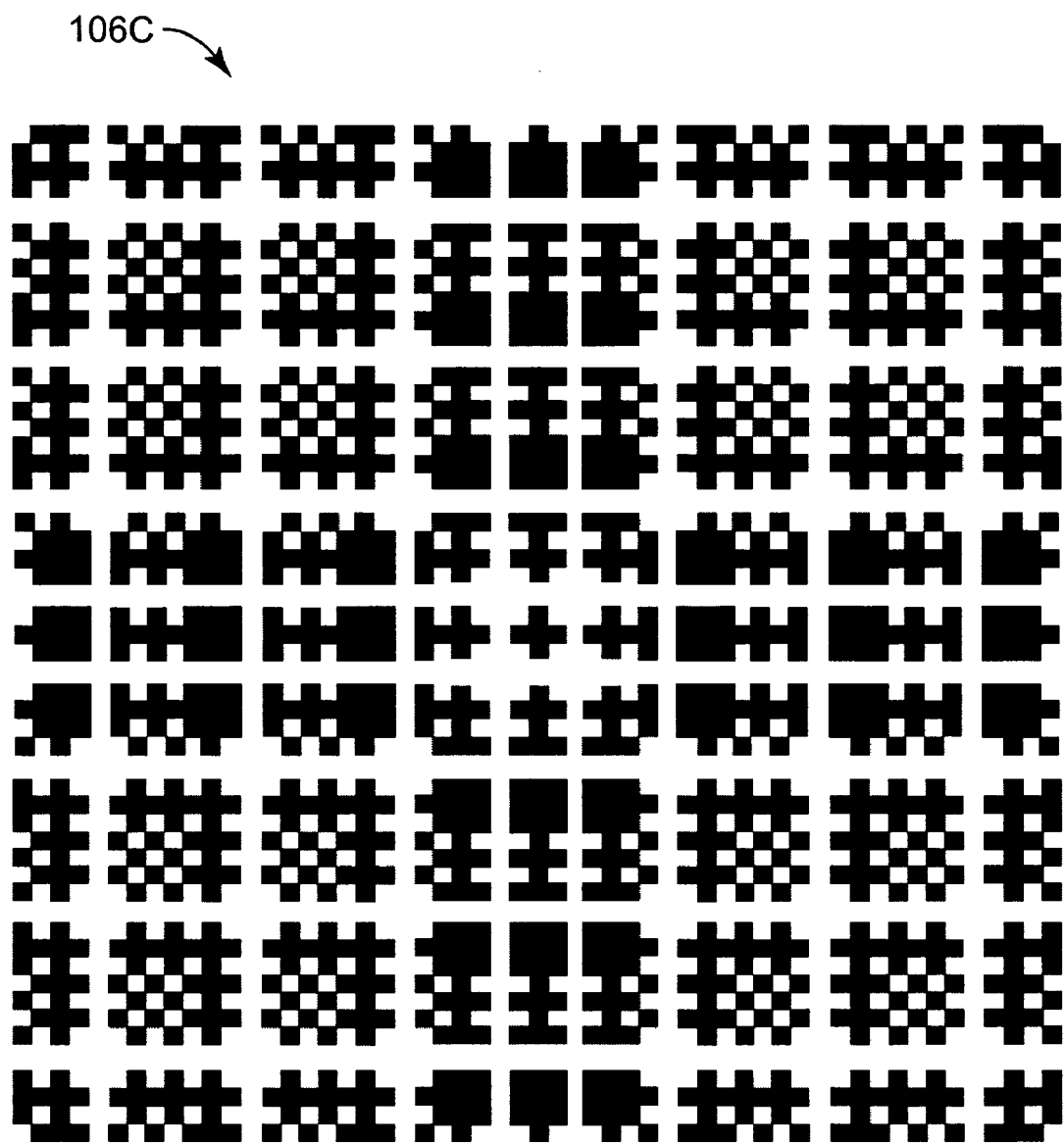
FIG. 5 is a diagram illustrating a 55×55-pixel 2-greyscale (binary) target according to the present teachings.

FIG. 4A is a diagram illustrating a 711×711-pixel 3-greyscale (ternary) target 106B in an embodiment according to the present teachings. Target 106B represents a second embodiment of the target 106 identified in FIG. 1. In the illustrated embodiment, target 106B is an expanded version of the target 106A shown in FIG. 3, with the 55×55-pixel center portion of the target 106B being identical to the target 106A. Thus, target 106A represents a zoomed-in display of the center portion of the target 106B. Because of the higher resolution of target 106B and the limited space for displaying this target 106B on the page, the complete pattern of horizontal and vertical lines for the target is not shown in FIG. 4A. Rather, an enlarged view of the circled portion of the target 106B is shown in FIG. 4B, and a description of the complete pattern of lines is described below.

Like target 106A target 106B also has only three grey levels, which are referred to herein as white, grey, and black. The two-dimensional target 106B includes vertical white lines and black lines, and horizontal white lines and black lines. The vertical and horizontal lines extend across the entire target 106B, and are formed on a grey background (shown with stipple shading in FIG. 4B) that also extends across the entire target 106B.

The target 106B has a much longer period sequence than the target 106A. In the concise notation described above with respect to FIG. 3, the target 106B according to one embodiment is fully specified by the following period sequence: 2,5,5,2,2, 5,4,3,2,5, 3,4,2,4,4, 4,2,3,5,4, 2,2,4,5,3, 2,3,4,5,2, 3,3,4,3,5, 2,4,3,4,4, 3,3,3,5,3, 3,2,2,2,3, 2,4,2,5,2, 5.

Note that the sequence for target 106B starts with 2,5,5,2, which is the sequence for the smaller 55×55 target 106A. This confirms that the smaller target 106A is actually the same as the center portion of the bigger 711×711 target 106B.

To ensure uniqueness, 2-, 3-, 4-, or 5-periods are sequenced without any three consecutive periods repeating. In other words, although there are three consecutive 2's and three consecutive 3's in the period sequence for target 106B, there is only one instance of the three consecutive 2's, and one instance of the three consecutive 3's. Similarly, all other sequences of three consecutive numbers in the period sequence for target 106B occur only once. A few larger sequences, such as 5,5,5 or 5,5,4 or 5,5,3 and their permutations, are excluded from the period sequence for target 106B. Different starting values (other than 2,5,5) and different sorting criteria generate other valid sequences, and produce different target designs. Much longer sequences (e.g., for much larger targets 106) are possible if 6-periods or longer are included.

In the illustrated embodiment, any 23×23-pixel (or larger) image of target 106B is unique. Conversely, given any 23×23-pixel (or larger) image, the location of the image within the target 106B can be determined uniquely from the pattern of lines. In practice, noise perturbations may erode differences between distinct sequences. Any measure to increase differences between similar sequences would widen error margin and increase system robustness. In one embodiment, differences between similar sequences are increased by exchanging (i.e., flipping) the black and white elements within the preamble for a plurality of judiciously chosen periods. In one embodiment, flipping is done in pairs in a symmetrical manner about the center of the target, thereby maintaining overall symmetry of the target. For example, a "3-period" sequence white-grey-black-grey-grey-grey becomes black-grey-white-grey-grey-grey after flipping. The target 106B with 24 flipped periods across the entire target 106B according to one embodiment is specified by the following period sequence (with flipped periods shown in bold and underlined): 2,5,5,2,2, 5,4,3,2,5, 3,4,2,4,4, 4,2,3,5, 4, 2,2,4,5,3, 2,3,4,5,2, 3,3,4,3,5, 2,4,3,4,4, 3,3,3,5,3, 3, 2,2,2,3, 2,4,2,5,2, 5.

FIG. 5 is a diagram illustrating a 55×55-pixel 2-greyscale (binary) target 106C according to an embodiment of the present teachings. Target 106C represents a third embodiment of the target 106 identified in FIG. 1. Target 106C is essentially a binary grey-scale version of the ternary greyscale target 106A shown in FIG. 3, wherein the gray background regions 310 in FIG. 3 are replaced by a checker-board design of black and white pixels with a 2-pixel pitch. At each intersection of a white line and a black line, the pixel at the intersection is defined to be white.

The three-gray level targets 106A and 106B tend to provide better performance than the two-gray level target 106C. Performance of target 106C can be enhanced if the checker-board design of black and white pixels is pitched at one pixel, rather than two pixels.

In one embodiment, the targets 106A–106C are completely deterministic. Analysis and simulation have shown that any 23×23 image within the 711×711 target 106B, for example, is absolutely unique. Therefore, in one form of the invention, embedded position codes are not used in targets 106A–106C to label locations. A larger-than-minimum image (e.g. 32×32-pixel) image provides redundant data for the regression algorithms (described below) to operate effectively in a "best fit" manner.

In one form of the invention, the targets 106A–106C are constructed by depositing semi-reflective and highly reflective chrome on a glass substrate to form grey pixels and white pixels, respectively. An anti-reflection coating is formed on the glass substrate to form black pixels. The three reflective values need only be nominally distinct and relatively uniform. A precise quantitative relationship (e.g., sinusoidal profile) is not used in one embodiment. For transmissive targets, digital printing on extremely fine-grain film proves convenient and economical for some applications.

III. Position Data Generator

Figure 6:
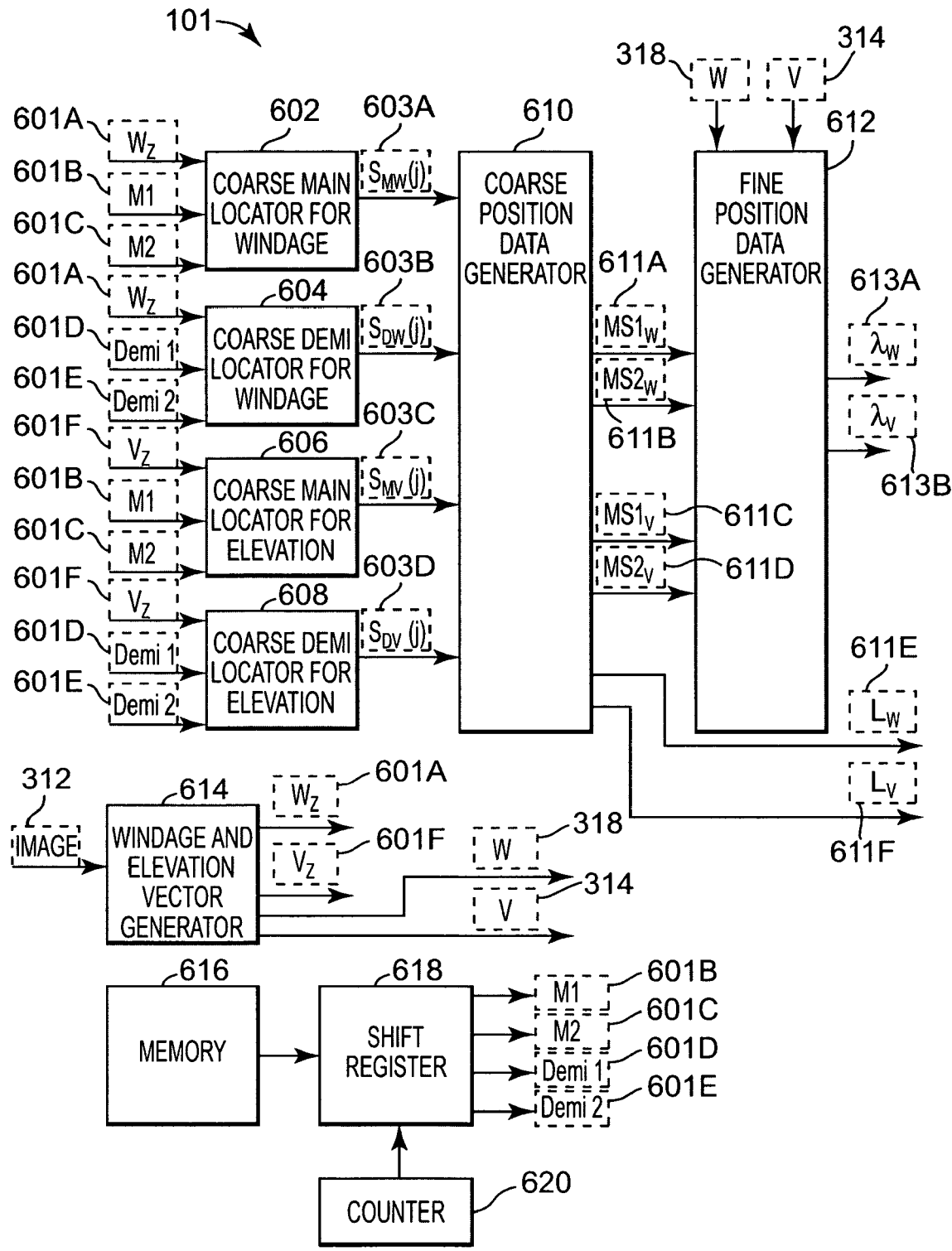
FIG. 6 is a block diagram illustrating major components of the position data generator shown in FIG. 1 according to the present teachings.

FIG. 6 is a block diagram illustrating major components of the position data generator 101 shown in FIG. 1 in an embodiment according to the present teachings. Position data generator 101 includes coarse main locator for windage 602, coarse demi locator for windage 604, coarse main locator for elevation 606, coarse demi locator for elevation 608, coarse position data generator 610, fine position data generator 612, windage and elevation vector generator 614, memory 616, shift register 618, and counter 620. Position data generator 101 first determines a coarse location of an image captured by sensor 102 using two independent one-dimensional regression processes, and then performs a second regression process to determine a fine location of the captured image.

In the following description, it will be assumed that sensor 102 is capturing images of the 55×55 pixel target 106A (FIG. 3), such as the image 312 shown in FIG. 3. The pixels of image 312 are shown perfectly aligned with the pixels of the target 106A. In practice, the pixels of image 312 will typically be offset from perfect alignment in both dimensions. The amount of offset can be determined accurately by fine position data generator 612 as described below with reference to FIGS. 13–15.

A. Coarse Position

A goal of the coarse location of the image 312 is to identify the coordinates of target 106A to within one pixel in both windage ($L_w$) and elevation ($L_v$). For purposes of explanation of the coarse location process, it will be assumed that the pixels of target 106A have the following intensities: black pixels have a light intensity of 0; grey pixels have a light intensity of 0.5; and white pixels have a light intensity of 1. In practice, light intensities may vary from one pixel to another, even within the same type from the same target, and grey intensity is seldom exactly half way. Redundancy in the regression algorithm, however, minimizes the effect of inter-pixel variations and grey bias. But for clarity of illustration, the intensities are idealized as 0, 0.5, and 1.

During the coarse location process, vector generator 614 receives image 312 and generates a zero-mean windage vector 601A ($W_z$) and a zero-mean elevation vector 601F ($V_z$), which both correspond to the image 312. The generation of these zero-mean vectors 601A and 601F according to one embodiment will now be described in further detail.

Vector generator 614 sums all sixteen columns of the image 312 to form a 16-element windage vector 318 (W), which is shown in FIG. 3. As shown in FIG. 3, the first column of image 312 includes fourteen white pixels and two gray pixels. Thus, the first element in the windage vector 318 (W) will be "15" (i.e., 14×1+2×0.5=15). Vector generator 614 performs this sum for each of the sixteen columns, which results in the sixteen-element windage vector 318 (W) given by the following Equation I:

$$W=(15,8,1,8,8,8,8,8,15,8,1,8,8,8,8,8) \quad \text{Equation I}$$

where:
　　W=windage vector 318.

Vector generator 614 also sums all sixteen rows of the image 312 to form a 16-element elevation vector 314 (V), which is shown in FIG. 3. As shown in FIG. 3, the first row of image 312 includes two white pixels, twelve gray pixels, and two black pixels. Thus, the first element in the elevation vector 314 (V) will be "8" (i.e., 2×1+12×0.5+2×0=8). Vector generator 614 performs this sum for each of the sixteen rows, which results in the sixteen-element elevation vector 314 (V) given by the following Equation II:

$$V=(8,15,8,8,8,8,8,1,8,15,8,8,8,8,8,1) \quad \text{Equation II}$$

where:
　　V=elevation vector 314.

Vector generator 614 sums all sixteen elements of the windage vector 318 (W) (or equivalently V), and divides the sum by sixteen to form an overall vector-average ($V_{avg}$) as shown by the following Equation III (Note that a divide-by-sixteen is only a 4-bit shift in binary notation).

$$V_{avg}=(15+8+1+8+8+8+8+8+15+8+1+8+8+8+8+8)/16=8. \quad \text{Equation III}$$

Vector generator 614 subtracts the vector-average ($V_{avg}$) from all elements of W and V to form zero-mean vectors 601A and 601F ($W_z$ and $V_z$), as shown in the following Equations IV and V, respectively:

$$W_z=(7,0,-7,0,0,0,0,0,7,0,-7,0,0,0,0,0) \quad \text{Equation IV}$$

where:
　　$W_z$=zero-mean windage vector 601A.

$$V_z=(0,7,0,0,0,0,0,-7,0,7,0,0,0,0,0,-7) \quad \text{Equation V}$$

where:
　　$V_z$=zero-mean elevation vector 601F.

The zero-mean vectors 601A and 601F ($W_z$ and $V_z$) represent a regression-distilled version of the original 16×16-pixel image 312, and are used to locate the two target image coordinates $L_w$ and $L_v$. In one embodiment, the original image elements of image 312 have 8-bit precision, and the summing described above adds two bits of precision. The zero-mean windage vector 601A ($W_z$) is output by vector generator 614 to coarse main locator for windage 602, and coarse demi locator for windage 604. The zero-mean elevation vector 601F ($V_z$) is output by vector generator 614 to coarse main locator for elevation 606, and coarse demi locator for elevation 608. The windage vector 318 (W) and the elevation vector 314 (V) are output by vector generator 614 to fine position data generator 612. The connections between some elements in FIG. 6 are not shown to simplify the illustration of the position data generator 101.

In one form of the invention, a plurality of sequences or vectors are determined based on the characteristics of target 106A, and stored in memory 616. In one embodiment, these sequences include a first main sequence 601B (M1), a second main sequence 601C (M2), a first demi sequence 601D (demi1), and a second demi sequence 601E (demi2).

In one form of the invention, the zero-mean vectors 601A and 601F ($W_z$ and $V_z$) may vary from image 312 to image 312, depending upon the location of the image 312 within the target 106A, while the sequences 601B, 601C, 601D, and 601E are pre-calculated constant sequences or vectors that are stored in memory 616 and do not vary from image 312 to image 312. As shown in FIG. 6, the sequences 601B, 601C, 601D, and 601E are output from memory 616 to shift register 618. The shift register 618, which is addressed by counter 620, synchronously shifts the four sequences 601B, 601C, 601D, and 601E into appropriate ones of the locators 602, 604, 606, and 608. The main sequences 601B and 601C (M1 and M2) are shifted into coarse main locator for windage 602 and coarse main locator for elevation 606, and the demi sequences 601D and 601E (demi1 and demi2) are shifted into coarse demi locator for windage 604 and coarse demi locator for elevation 608. The determination of the values for sequences 601B, 601C, 601D, and 601E is described in further detail below.

As described above with respect to FIG. 3, target 106A has a 2,5,5,2 period sequence. A 2,5,5,2 period sequence when symbolically spelled out in full appears as a 55-element ternary sequence M3 as shown in the following Equation VI (with spaces added to facilitate readability):

$$M3=(0,0,-1,0,1,\ 0,0,0,0,0,-1,0,1,\ 0,0,0,0,0,-1,0,1,$$
$$0,0,-1,0,1,\ 0,-1,0,\ 1,0,-1,0,0,\ 1,0,-1,0,0,0,0,0,$$
$$1,0,-1,0,0,0,0,0,\ 1,0,-1,0,0) \quad \text{Equation VI}$$

A sequence demi3 is created by (algebraically) adding two consecutive elements of M3 together as shown by the following Equation VII:

$$\text{demi3}(i)=M3(i)+M3(i+1) \text{ for } i \text{ from } -27 \leq i \leq +26$$

demi3(27) is defined as 1  Equation VII

Note that the resulting sequence demi3 is also ternary. The resulting demi3 sequence is given by the following Equation VII:

$$\text{demi3}=(0,-1,-1,1,1,\ 0,0,0,0,-1,-1,1,1,\ 0,0,0,0,-1,-1,$$
$$1,1,\ 0,-1,-1,1,1,\ -1,-1,1,\ 1,-1,-1,0,1,\ 1,-1,-1,$$
$$0,0,0,0,1,\ 1,-1,-1,0,0,0,0,1,\ 1,-1,-1,0,1) \quad \text{Equation VIII}$$

Ternary logic is not common in the industry. Conversion to the more common binary logic facilitates implementation with readily available digital binary logic circuits. The logical equations for conversion are given below in the following Table I:

TABLE I

| Ternary M3 | binary M2 | M1 |
|---|---|---|
| −1 | 1 | 1 |
| 0 | 0 | 0 |
| 1 | 0 | 1 |
| Don't care | 1 | 0 |

Using the conversions given in Table I, the ternary sequence M3 defined in Equation VI can be converted into two binary sequences 601B and 601C (M1 and M2) as shown by the following Equations IX and X, respectively:

$$M1=(0,0,1,0,1,\ 0,0,0,0,0,1,0,1,\ 0,0,0,0,0,1,0,1,\ 0,0,1,$$
$$0,1,\ 0,1,0,\ 1,0,1,0,0,\ 1,0,1,0,0,0,0,0,\ 1,0,1,0,0,0,$$
$$0,0,\ 1,0,1,0,0) \quad \text{Equation IX}$$

$$M2=(0,0,1,0,0,\ 0,0,0,0,0,1,0,0,\ 0,0,0,0,0,1,0,0,\ 0,0,1,$$
$$0,0,\ 0,1,0,\ 0,0,1,0,0,\ 0,0,1,0,0,0,0,0,\ 0,0,1,0,0,0,$$
$$0,0,\ 0,0,1,0,0) \quad \text{Equation X}$$

The ternary sequence demi3 defined in Equation VIII can be converted into two binary sequences 601D and 601E (demi1 and demi2) in the same manner as shown by the following Equations XI and XII, respectively:

$$\text{demi1}=(0,1,1,1,1,\ 0,0,0,0,1,1,1,1,\ 0,0,0,0,1,1,1,1,\ 0,1,$$
$$1,1,1,\ 1,1,1,\ 1,1,1,0,1,\ 1,1,1,0,0,0,0,1,\ 1,1,1,0,0,$$
$$0,0,1,\ 1,1,1,0,1) \quad \text{Equation XI}$$

$$\text{demi2}=(0,1,1,0,0,\ 0,0,0,0,1,1,0,0,\ 0,0,0,0,1,1,0,0,\ 0,1,$$
$$1,0,0,\ 1,1,0,\ 0,1,1,0,0,\ 0,1,1,0,0,0,0,0,0,\ 0,1,1,0,0,$$
$$0,0,0,\ 0,1,1,0,0) \quad \text{Equation XII}$$

The four fixed sequences 601B (M1), 601C (M2), 601D (demi1), and 601E (demi2), together with vectors 601A ($W_z$) and 601F ($V_z$), are used in one embodiment to coarse locate (e.g., within 1 pixel) image 312 in both windage (horizontal) and elevation (vertical). Since the target pattern is the same in either dimension in one embodiment, a common algorithm may be used for both dimensions. Hardware requirements may be modest, and the four operations described below with reference to FIGS. 7–10 can be performed in parallel.

The demi-sequences 601D and 601E are best at locating images 312 that lie near halfway between two adjacent target pixels. The demi-sequences 601D and 601E also help determine, in each dimension, the correct two consecutive 16-element subsets of main vectors 601B and 601C bracketing the image 312, not just the one subset of the main vector that is closest.

As shown in FIG. 6, coarse main locator for windage 602 generates a plurality of main windage selector values 603A ($S_{MW}(j)$), wherein "j" is an index for identifying individual selector values, and outputs the selector values 603A to coarse position data generator 610. Coarse demi locator for windage 604 generates a plurality of demi windage selector values 603B ($S_{DW}(j)$), and outputs the selector values 603B to coarse position data generator 610. Coarse main locator for elevation 606 generates a plurality of main elevation selector values 603C ($S_{MV}(j)$), and outputs the selector values 603C to coarse position data generator 610. Coarse demi locator for elevation 608 generates a plurality of demi elevation selector values 603D ($S_{DV}(j)$), and outputs the selector values 603D to coarse position data generator 610. The generation of the selector values 603A, 603B, 603C, and 603D, by locators 602, 604, 606, and 608, respectively, will now be described in further detail below with reference to FIGS. 7–10.

Figure 7:
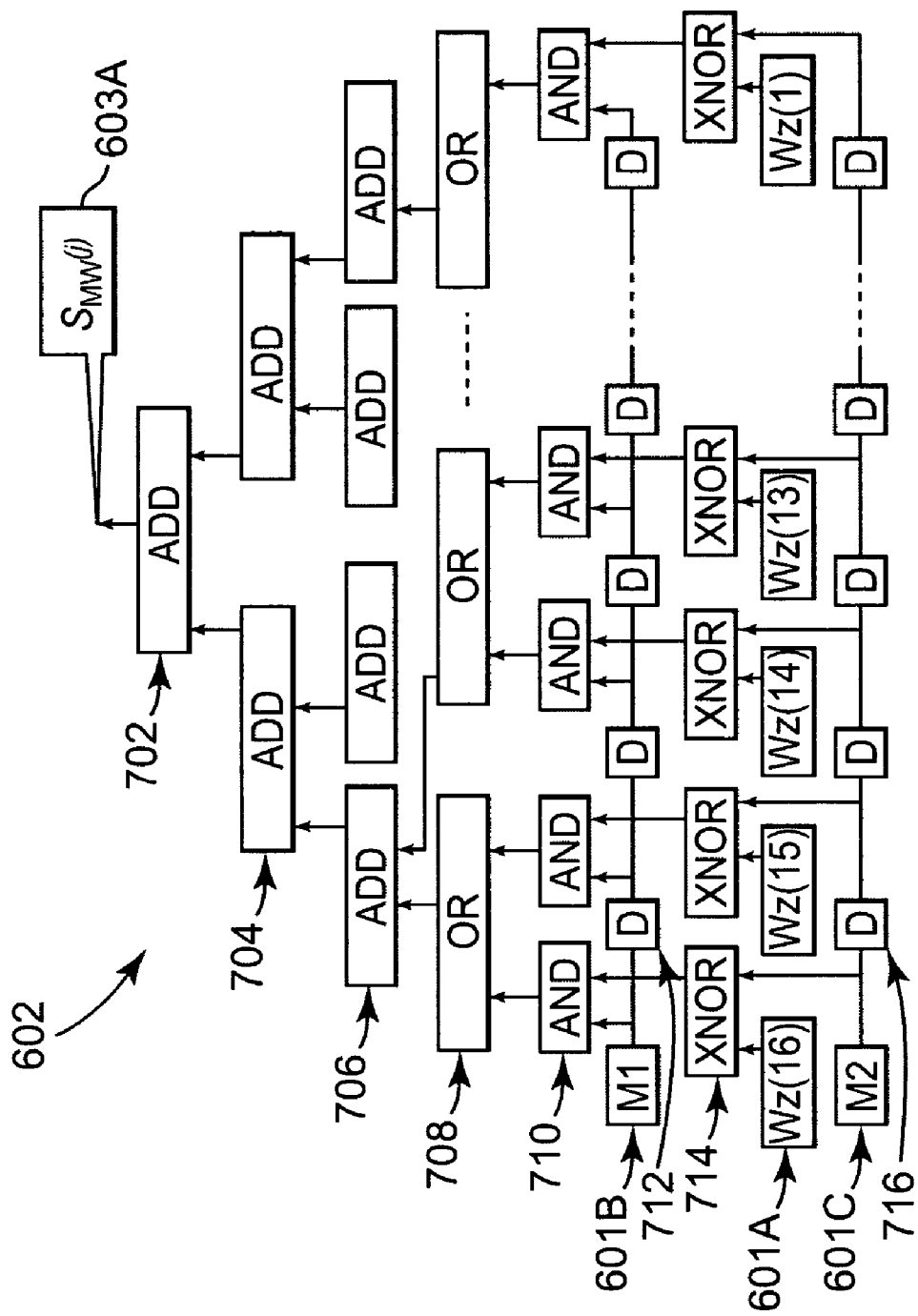
FIG. 7 is a schematic diagram illustrating major components of the coarse main locator for windage shown in block form in FIG. 6 according to the present teachings.

FIG. 7 is a schematic diagram illustrating major components of the coarse main locator for windage 602 shown in block form in FIG. 6 in one embodiment according to the present teachings. The coarse main locator for windage 602 effectively locates images that are not significantly offset horizontally from the horizontal target grid. As shown in FIG. 7, the coarse main locator for windage 602 includes adder 702, a row of adders 704, a row of adders 706, a row of OR gates 708, a row of AND gates 710, a row of delay (D) elements 712, a row of XNOR gates 714, and a row of delay elements 716.

The sixteen elements of the zero-mean windage vector 601A ($W_z$) are shown in FIG. 7 as $W_Z(16)$, $W_Z(15)$, ..., $W_Z(1)$. In one embodiment, each element of the vector 601A is padded with four least significant bits equal to its most significant bit. The initial sixteen bits of sequences 601B and 601C (M1 and M2) are simultaneously shifted into locator 602, which causes locator 602 to produce a first main windage selector 603A ($S_{MW}(1)$). Sequences 601B and 601C (M1 and M2) continue to shift through the pipe-lined delay elements 712 and 716, respectively, for all 39 (i.e., 55–16) lags.

Through the use of the row of AND gates 710, the sequence 601B (M1) activates only the proper elements of the vector 601A (Wz) for accumulation. Through the row of XNOR gates 714, the sequence 601C (M2) determines the accumulation polarity. It is recognized that merely complementing all of the bits of an element of the vector 601A ($W_z$) does not change the sign of a 2's complement number, being one short at the least significant bit. However, padding these elements with a few least significant bits as mentioned above minimizes this error.

Note that there are no adjacent "1's" in the sequence 601B (M1) (See Equation IX). Thus, the first level of summation is accomplished in the illustrated embodiment with a simple OR function as shown by the row of OR gates 708. A cascade of four levels of summation (represented by the row of OR gates 708, and the three rows of adders 706, 704, and 702) culminates in producing thirty-nine values of the main windage selector 603A ($S_{MW}$(j)), one for each lag j.

The main windage selector values 603A (($S_{MW}$(j)) are output by coarse main locator for windage 602 to coarse position data generator 610 (FIG. 6). A running maximum of the main windage selector values 603A ($S_{MW}$($j_{MW}$)) is tracked and recorded by coarse position data generator 610, along with the value $j_{MW}$ when the maximum occurs.

Figure 8:
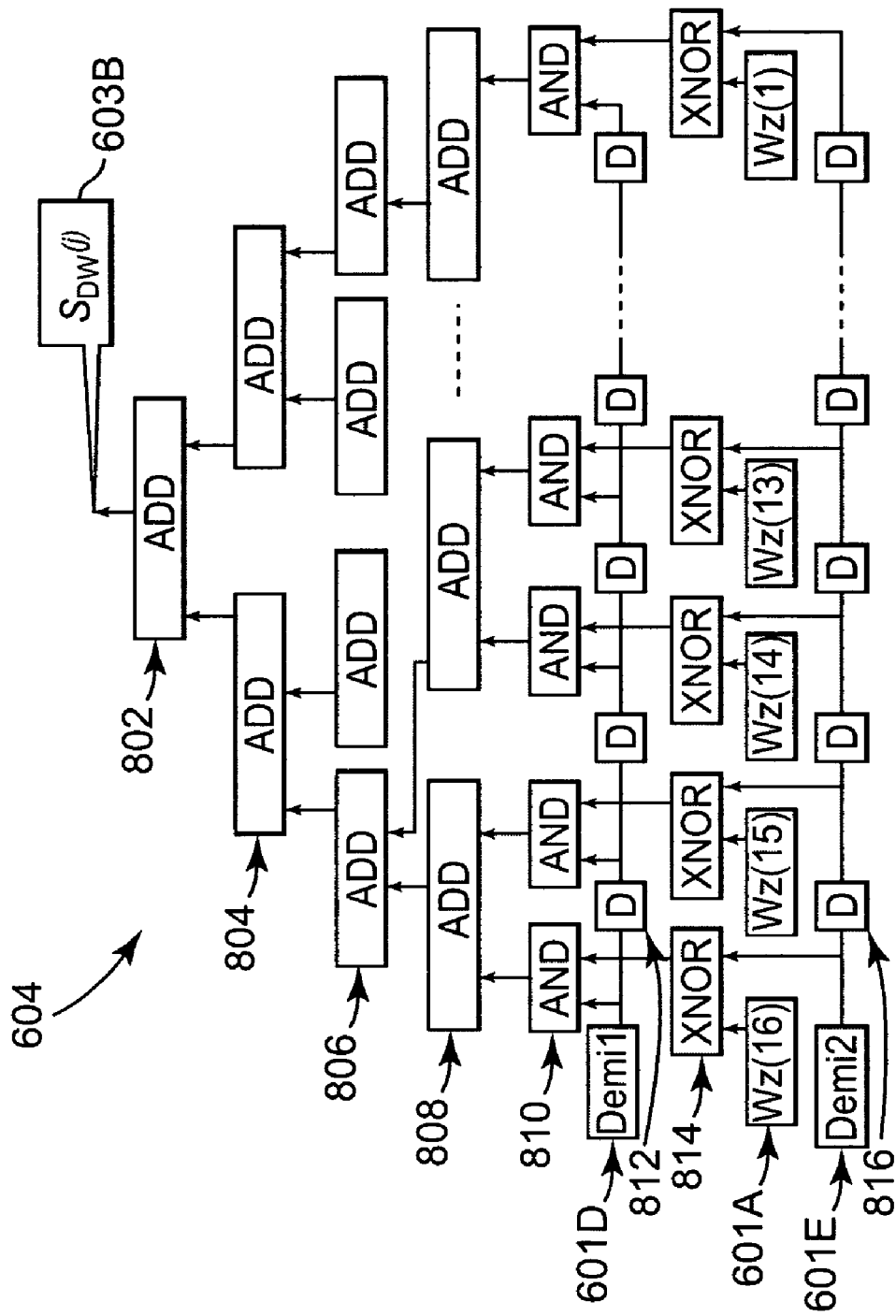
FIG. 8 is a schematic diagram illustrating major components of the coarse demi locator for windage shown in block form in FIG. 6 according to the present teachings.

FIG. 8 is a schematic diagram illustrating major components of the coarse demi locator for windage 604 shown in block form in FIG. 6 according to one embodiment of the present invention. The coarse demi locator for windage 604 effectively locates images that are near half-way between the horizontal target grids. As shown in FIG. 8, the coarse demi locator for windage 604 includes adder 802, a row of adders 804, a row of adders 806, a row of adders 808, a row of AND gates 810, a row of delay (D) elements 812, a row of XNOR gates 814, and a row of delay elements 816.

The coarse demi locator for windage 604 operates in the same manner as the coarse main locator for windage 602 described above with reference to FIG. 7, but rather than using the main sequences 601B and 601C (M1 and M2) like locator 602, locator 604 uses the two demi sequences 601D and 601E (demi1 and demi2) to enable the correct elements of the zero-mean windage vector 601A ($W_z$) for summation and to control the summation signs. Unlike the first main sequence 601B (M1), two adjacent values of the first demi sequence 601D (demi1), may both be nonzero (see Equation XI). Therefore the first summation level is shown as a row of adders 808, rather than the row of OR gates 708 shown in FIG. 7.

In the same manner described above with respect to FIG. 7, a new demi windage selector value 603B ($S_{DW}$(j)) is generated with each lag shift, producing a total of thirty-nine values of the demi windage selector 603B ($S_{DW}$(j)), one for each lag j. The demi windage selector values 603B (($S_{DW}$(j)) are output by coarse demi locator for windage 604 to coarse position data generator 610 (FIG. 6). A running maximum of the demi windage selector values 603B ($S_{DW}$($j_{DW}$)) is tracked and recorded by coarse position data generator 610, along with the value $j_{DW}$ when the maximum occurs.

Figure 9:
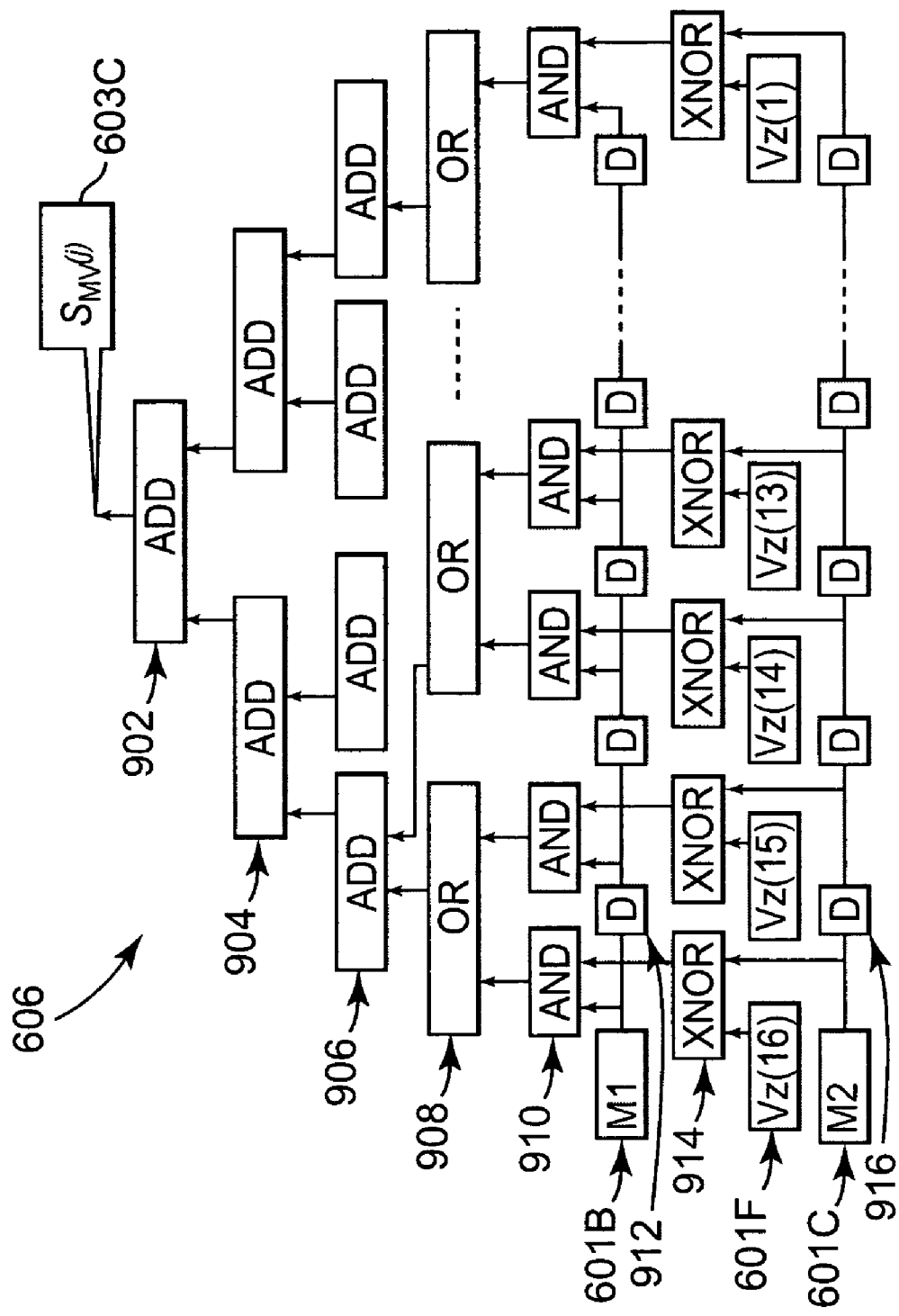
FIG. 9 is a schematic diagram illustrating major components of the coarse main locator for elevation shown in block form in FIG. 6 according to the present teachings.

FIG. 9 is a schematic diagram illustrating major components of the coarse main locator for elevation 606 shown in block form in FIG. 6 in one embodiment according to the present teachings. The coarse main locator for elevation 606 effectively locates images that are not significantly offset vertically from the vertical target grid. As shown in FIG. 9, the coarse main locator for elevation 606 includes adder 902, a row of adders 904, a row of adders 906, a row of OR gates 908, a row of AND gates 910, a row of delay (D) elements 912, a row of XNOR gates 914, and a row of delay elements 916.

The coarse main locator for elevation 606 is configured in the same manner as the coarse main locator for windage 602 shown in FIG. 7, but the coarse main locator for elevation 606 operates on the zero-mean elevation vector 601F ($V_z$), as opposed to the zero-mean windage vector 601A ($W_z$) operated on by the coarse main locator for windage 602.

A new main elevation selector value 603C ($S_{MV}$(j)) is generated with each lag shift, producing a total of thirty-nine values of the main elevation selector 603C ($S_{MV}$(j)), one for each lag j. The main elevation selector values 603C (($S_{MV}$(j)) are output by coarse main locator for elevation 606 to coarse position data generator 610 (FIG. 6). A running maximum of the main elevation selector values 603C ($S_{MV}$($j_{MV}$)) is tracked and recorded by coarse position data generator 610, along with the value $j_{MV}$ when the maximum occurs.

Figure 10:
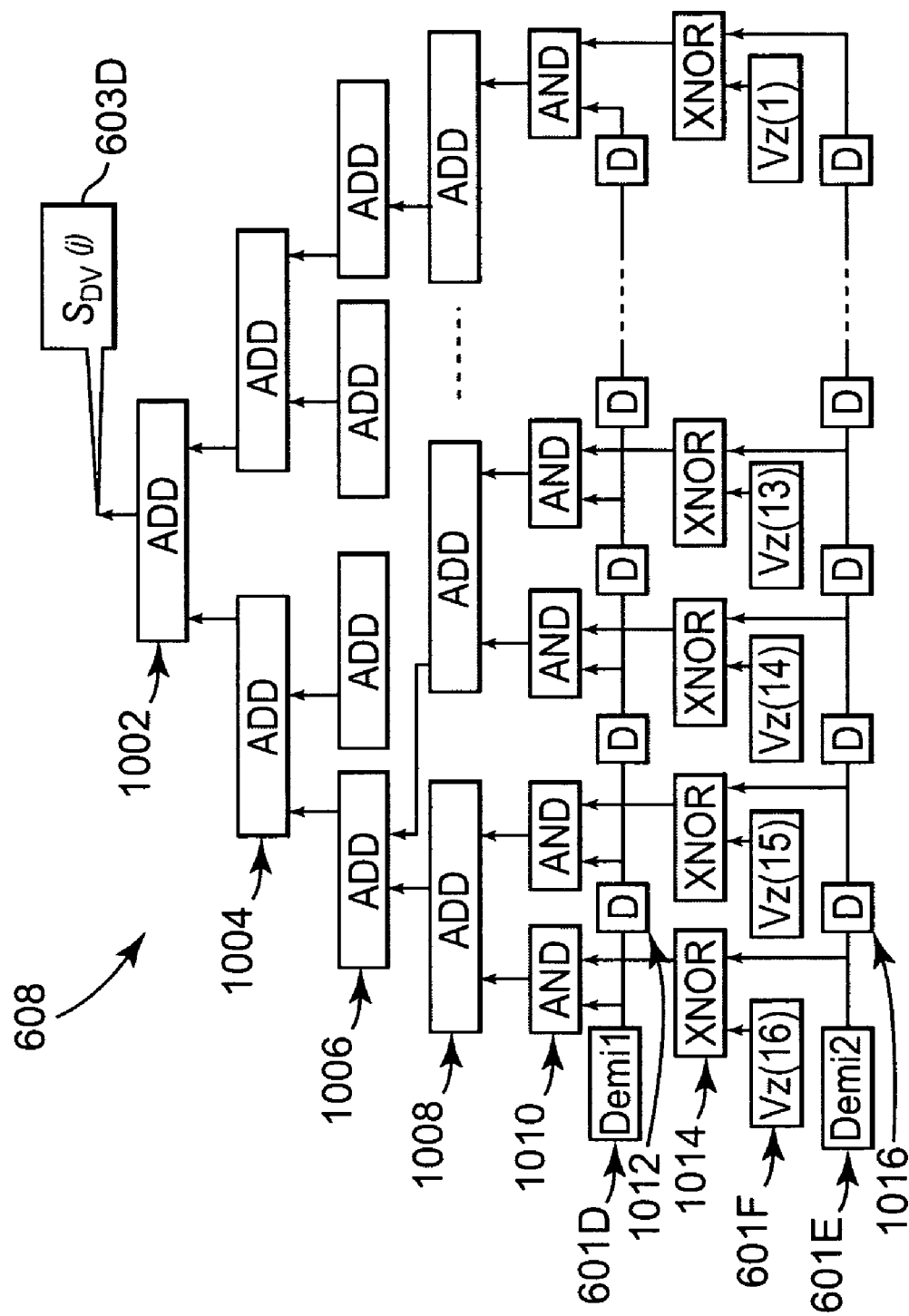
FIG. 10 is a schematic diagram illustrating major components of the coarse demi locator for elevation shown in block form in FIG. 6 according to the present teachings.

FIG. 10 is a schematic diagram illustrating major components of the coarse demi locator for elevation 608 shown in block form in FIG. 6 in an embodiment according to the present teachings. The coarse demi locator for elevation 608 effectively locates images that are near half-way between vertical target grids. As shown in FIG. 10, the coarse demi locator for elevation 608 includes adder 1002, a row of adders 1004, a row of adders 1006, a row of adders 1008, a row of AND gates 1010, a row of delay (D) elements 1012, a row of XNOR gates 1014, and a row of delay elements 1016.

The coarse demi locator for elevation 608 is configured in the same manner as the coarse demi locator for windage 604 shown in FIG. 8, but the coarse demi locator for elevation 608 operates on the zero-mean elevation vector 601F ($V_z$), as opposed to the zero-mean windage vector 601A ($W_z$) operated on by the coarse demi locator for windage 604.

A new demi elevation selector value 603D ($S_{DV}$(j)) is generated with each lag shift, producing a total of thirty-nine values of the demi elevation selector 603D ($S_{DV}$(j)), one for each lag j. The demi elevation selector values 603D (($S_{DV}$(j)) are output by coarse demi locator for elevation 608 to coarse position data generator 610 (FIG. 6). A running maximum of the demi elevation selector values 603D ($S_{DV}$($j_{DV}$)) is tracked and recorded by coarse position data generator 610, along with the value $j_{DV}$ when the maximum occurs.

Coarse location processing, in one embodiment, is achieved using non-zero-mean windage and elevation vectors. In this process, a term equaling the product of the respective vector overall average $V_{avg}$ (Equation III) and the sum of the subset code in each lag, is subtracted out from the selection value. The product is produced by accumulators dynamically controlled by the M1 and M2 (or demi1 and demi2) vectors as they shift through all the lags, accumulating the values of the windage (or elevation) $V_{avg}$.

In one embodiment, the four locators 602, 604, 606, and 608, shown in FIGS. 7–10, respectively, operate simultaneously to generate the selector values 603A, 603B, 603C, and 603D. After all of the selector values 603A, 603B, 603C, and 603D have been generated by locators 602, 604, 606, and 608, respectively, coarse position generator 610 will have identified a largest selector value 603A ($S_{MW}$($j_{MW}$)), a largest selector value 603B ($S_{DW}$($j_{DW}$)), a largest selector value 603C ($S_{MV}$($j_{MV}$)), and a largest selector value 603D ($S_{DV}$($j_{DV}$)). In one form of the invention, coarse position data generator 610 determines a coarse windage location based on a comparison of the largest selector value 603A ($S_{MW}(j_{MW})$) and the largest selector value 603B ($S_{DW}(j_{DW})$)×0.7071, and determines a coarse elevation location based on a comparison of the largest selector value 603C ($S_{MV}(j_{MV})$) and the largest selector value 603D ($S_{DV}(j_{DV})$)× 0.7071.

In addition to the maximum windage selector values 603A ($S_{MW}(j_{MW})$) and 603B ($S_{DW}(j_{DW})$), there is one more bit of information, $Q_W$, that is used in completing the coarse windage location determination. In one embodiment, coarse position data generator 610 compares the maximum windage selector value 603B ($S_{DW}(j_{MW})$) with the windage selector value 603B immediately preceding the maximum value (i.e., $S_{DW}(j_{MW}-1)$). If $S_{DW}(j_{MW})$ is greater than $S_{DW}(j_{MW}-1)$, coarse position data generator 610 assigns a value of "0" to the variable $Q_W$. If $S_{DW}(j_{MW})$ is less than $S_{DW}(j_{MW}-1)$, coarse position data generator 610 assigns a value of "−1" to the variable $Q_W$.

The final coarse windage location, $L_W$, is established by coarse position data generator 610 as follows: (1) If the maximum $S_{DW}(j_{DW})/\sqrt{2}$ is greater than the maximum $S_{MW}(j_{MW})$, then $j_{DW} \leq L_W \leq j_{DW}+1$; (2) If the maximum $S_{MW}(j_{MW})$ is greater than the maximum $S_{DW}(j_{DW})/\sqrt{2}$, then $j_{MW}+Q_W \leq L_W \leq j_{MW}+Q_W+1$.

In addition to the maximum elevation selector values 603C ($S_{MV}(j_{MV})$) and 603D ($S_{DV}(j_{DV})$), there is one more bit of information, $Q_V$, that is used in completing the coarse elevation location determination. In one embodiment, coarse position data generator 610 compares the maximum elevation selector value 603D ($S_{DV}(j_{MV})$) with the windage selector value 603D immediately preceding the maximum value (i.e., $S_{DV}(j_{MV}-1)$). If $S_{DV}(j_{MV})$ is greater than $S_{DV}(j_{MV}-1)$, coarse position data generator 610 assigns a value of "0" to the variable $Q_V$. If $S_{DV}(j_{MV})$ is less than $S_{DV}(j_{MV}-1)$, coarse position data generator 610 assigns a value of "−1" to the variable $Q_V$.

The final coarse elevation location, $L_V$, is established by coarse position data generator 610 as follows: (1) If the maximum $S_{DV}(j_{DV})/\sqrt{2}$ is greater than the maximum $S_{MV}(j_{MV})$, then $j_{DV} \leq L_V \leq j_{DV}+1$; (2) If the maximum $S_{MV}(j_{MV})$ is greater than the maximum $S_{DV}(j_{DV})/\sqrt{2}$, then $j_{MV}+Q_V \leq L_V \leq j_{MV}+Q_V+1$.

Note that the demi selectors $S_{DW}(j_{DW})$ and $S_{DV}(j_{DV})$ are multiplied by the factor "$1/\sqrt{2}$" before being compared to the main selectors $S_{MW}(j_{MW})$ and $S_{MV}(j_{MV})$, respectively. A reason for this is that the demi selectors represent the addition of two orthogonal vectors, so the demi selectors are the square root of two larger than the main selectors.

Using the above-defined coarse location process, the coarse windage 611E ($L_W$) and coarse elevation 611F ($L_V$) are both located by coarse position data generator 610 to within one pixel, and output from coarse position data generator 610 as shown in FIG. 6. The coordinates $L_W$ and $L_V$ provide the lower bounds, to within one pixel, of the absolute coarse location of the imaged portion of the target 106A with respect to the origin of the target 106A. In an embodiment according to the present teachings, fine position data generator 612 further narrows the location down to fractional-pixel precision. The fractional pixels, referred to as $\lambda_W$ and $\lambda_V$, as determined by generator 612, are added respectively to $L_W$ and $L_V$, to generate the fine absolute location in two dimensions.

Figure 11:
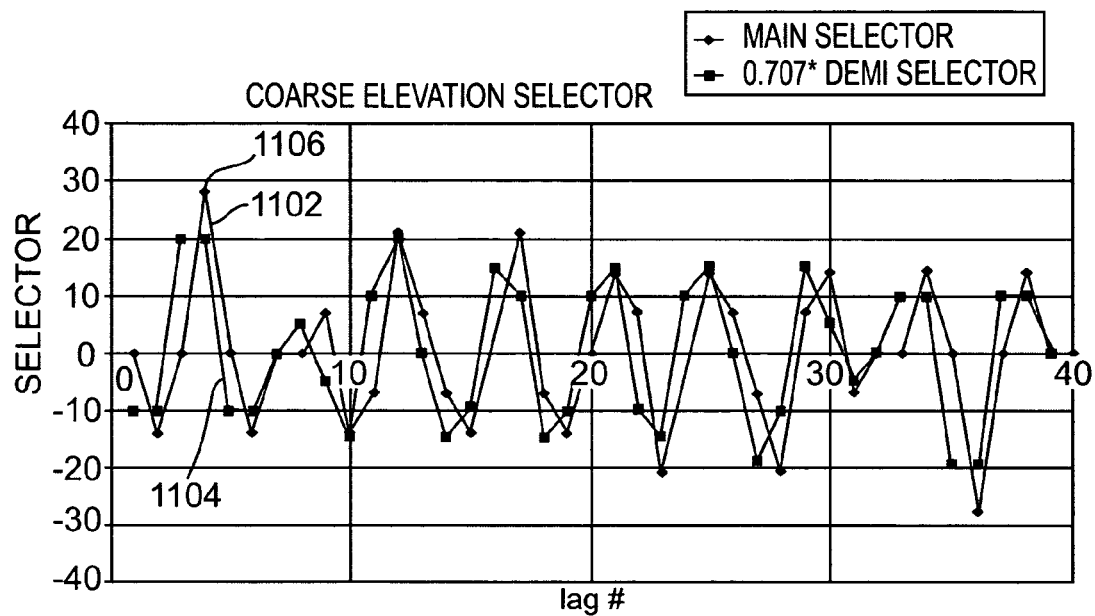
FIG. 11 is a diagram illustrating a graph of coarse selectors for elevation according to the present teachings.
Figure 12:
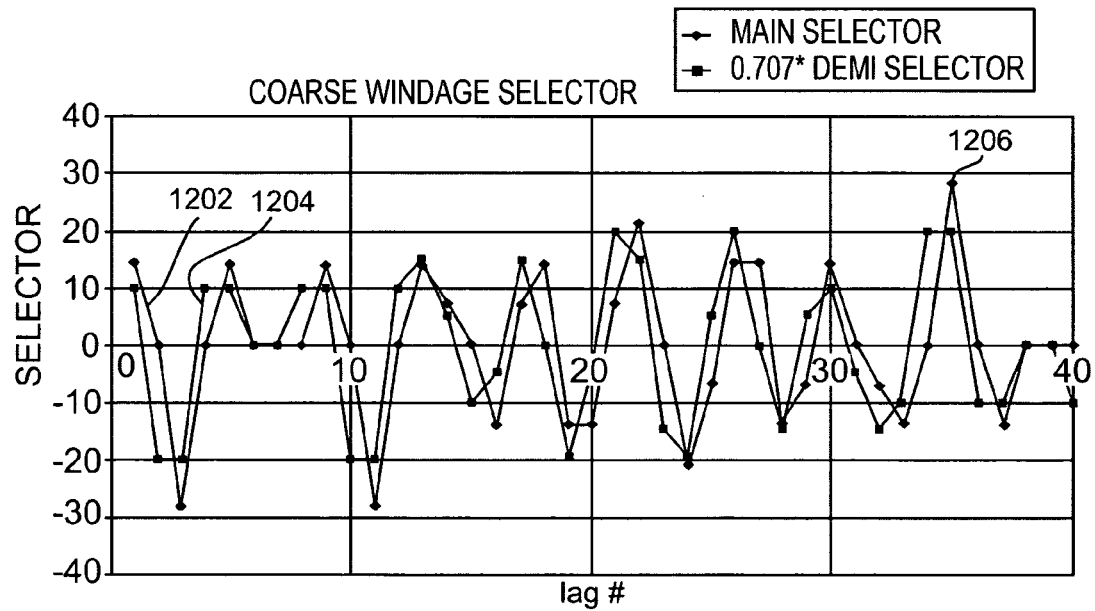
FIG. 12 is a diagram illustrating a graph of coarse selectors for windage according to the present teachings.

The coarse location process for the sample image 312 shown in FIG. 1 is illustrated in FIGS. 11 and 12. FIG. 11 is a diagram illustrating a graph of coarse selectors for elevation 603C and 603D ($S_{MV}(j)$ and $S_{DV}(j)$) for the image 312 in an embodiment according to the present teachings. The vertical axis in FIG. 11 represents the value of the selectors, and the horizontal axis represents the lag number, j. Graph 1102 is a graph of the main elevation selector values 603C ($S_{MV}(j)$) for all 40 lags, j. Graph 1104 is a graph of the demi elevation selector values 603D ($S_{DV}(j)$) divided by the square root of two for all 40 lags, j. The maximum value appearing in the graph shown in FIG. 11 is the fourth lag of the main elevation selector, $S_{MV}(4)$, which is identified by reference number 1106. Since the image 312 is not offset at all from the target grid, but rather is aligned with the target grid, the demi elevation selector values 603D ($S_{DV}(j)$) make no contribution to the position determination, and the coarse elevation, $L_V$, is equal to "4."

FIG. 12 is a diagram illustrating a graph of coarse selectors for windage 603A and 603B ($S_{MW}(j)$ and $S_{DW}(j)$) in an embodiment according to the present teachings. The vertical axis in FIG. 12 represents the value of the selectors, and the horizontal axis represents the lag number, j. Graph 1202 is a graph of the main windage selector values 603A ($S_{MW}(j)$) for all 40 lags, j. Graph 1204 is a graph of the demi windage selector values 603B ($S_{DW}(j)$) divided by the square root of two for all 40 lags, j.

The maximum value appearing in the graph shown in FIG. 12 is the thirty-fifth lag of the main windage selector, $S_{MW}(35)$, which is identified by reference number 1206. Since the image 312 is not offset at all from the target grid, but rather is aligned with the target grid, the demi windage selector values 603B ($S_{DW}(j)$) make no contribution to the position determination, and the coarse windage, $L_W$, is equal to "35." Thus, the image 312 is located at absolute position (4, 35).

B. Fine Position

The following is a description of a fine position determination process performed by fine position data generator 612 (FIG. 6) according to one embodiment of the invention. Because the same process is used for both windage and elevation in one embodiment, only the fine windage determination is described. After the coarse position determination described above, the image location is bracketed between two consecutive overlapping 16-element vectors of M3 (Equation VI), making a total of 17 (ternary) elements. These 17 selected elements of M3 correspond to two 17-element binary vectors within M1 (Equation IX) and M2 (Equation X). These selected subsets of M1 and M2 are labeled MS1 and MS2, respectively, where "S" stands for "selected". The selected subsets for windage are $MS1_W$ and $MS2_W$, and the selected subsets for elevation are $MS1_V$ and $MS2_V$. In an embodiment according to the present teachings, coarse position data generator 610 determines $MS1_W$ 611A (FIG. 6), $MS2_W$ 611B, $MS1_V$ 611C, $MS2_V$ 611D, and outputs these four vectors to fine position data generator 612. As shown in FIG. 6, fine position data generator 612 also receives windage vector 318 (W) and elevation vector 314 (V).

In general, a captured image 312 will not typically lie exactly along target pixel lines as shown in FIG. 3. In such cases, the location of the image 312 in the windage dimension can be further refined to a fraction 613A ($\lambda_W$) of one target pixel (i.e., $0 \leq \lambda_W < 1$), and to a fraction 613B ($\lambda_V$) of one target pixel in the elevation dimension. Assume that it is has been determined from the coarse position process that the windage position is located between the $35^{th}$ and the $36^{th}$ lag (i.e., the image 312 is offset to the right by a fraction of a pixel from the location shown in FIG. 3). The fraction, $\lambda_W$, can be estimated by linear regression using the known selected vectors $MS1_W$ and $MS2_W$ corresponding to the $35^{th}$ and $36^{th}$ lags, respectively.

In one embodiment, the process for determining the fine location is the same in the windage and elevation dimensions. Thus, in the following description, the subscript-W and subscript-V are not used with the selected vectors MS1 and MS2, and the fractional pixel position, λ. It will be understood that the following description and equations are applicable to both the windage and elevation dimensions.

A relationship between the calculated windage vector (W) and the unknown sensor recordings for white, grey, and black pixels is given by the following Equation XIII:

$$[w1, w2, w3, w4, w5, w6, w7, w8, w9, w10, w11,$$
$$w12, w13, w14, w15, w16] = (1-\lambda) \cdot [w, g, b, g, g,$$
$$g, g, g, w, g, b, g, g, g, g, g] + \lambda \cdot [g, b, g, g, g, g,$$
$$g, w, g, b, g, g, g, g, g, w] \qquad \text{Equation XII}$$

where:

w1, w2, . . . , w16=calculated values of the windage vector (W);

λ=fractional pixel location;

w=unknown sensor recording for a white pixel;

g=unknown sensor recording for a grey pixel; and b=unknown sensor recording for a black pixel.

In one embodiment, the zero-mean windage vector, $W_z$, is used in Equation XIII rather than the windage vector, W. The fine location regression process is immune to mean values.

The relationship defined in Equation XIII can be expanded into sixteen equations with four unknowns. In one form of the invention, a best-fit solution is provided by linear regression. An embodiment according to the present teachings uses a special form of linear regression, called Block Regression, which uses very few computations, and the bulk of the computations can be implemented with high-speed digital hardware accumulators and counters.

In one form of the block regression process, the sixteen equations are first reduced to five equations by summing equations of the same type. Summing equations in this manner reduces complexity and averages out data noise in the process. Thus, by summing equations of the same type, Equation XIII can be re-written in the form given by the following Equation XIV:

$$[w8+w16, w1+w9, w2+w10, w3+w11, w4+w5+w6+$$
$$w7+w12+w13+w14+w15] = (1-\lambda) \cdot [2g, 2w, 2g,$$
$$2b, 8g] + \lambda \cdot [2w, 2g, 2b, 2g, 8g] \qquad \text{Equation XIV}$$

where:

w1, w2, . . . , w16=calculated values of the windage vector (W);

λ=fractional pixel location;

w=unknown sensor recording for a white pixel;

g=unknown sensor recording for a grey pixel; and b=unknown sensor recording for a black pixel.

Figure 13:
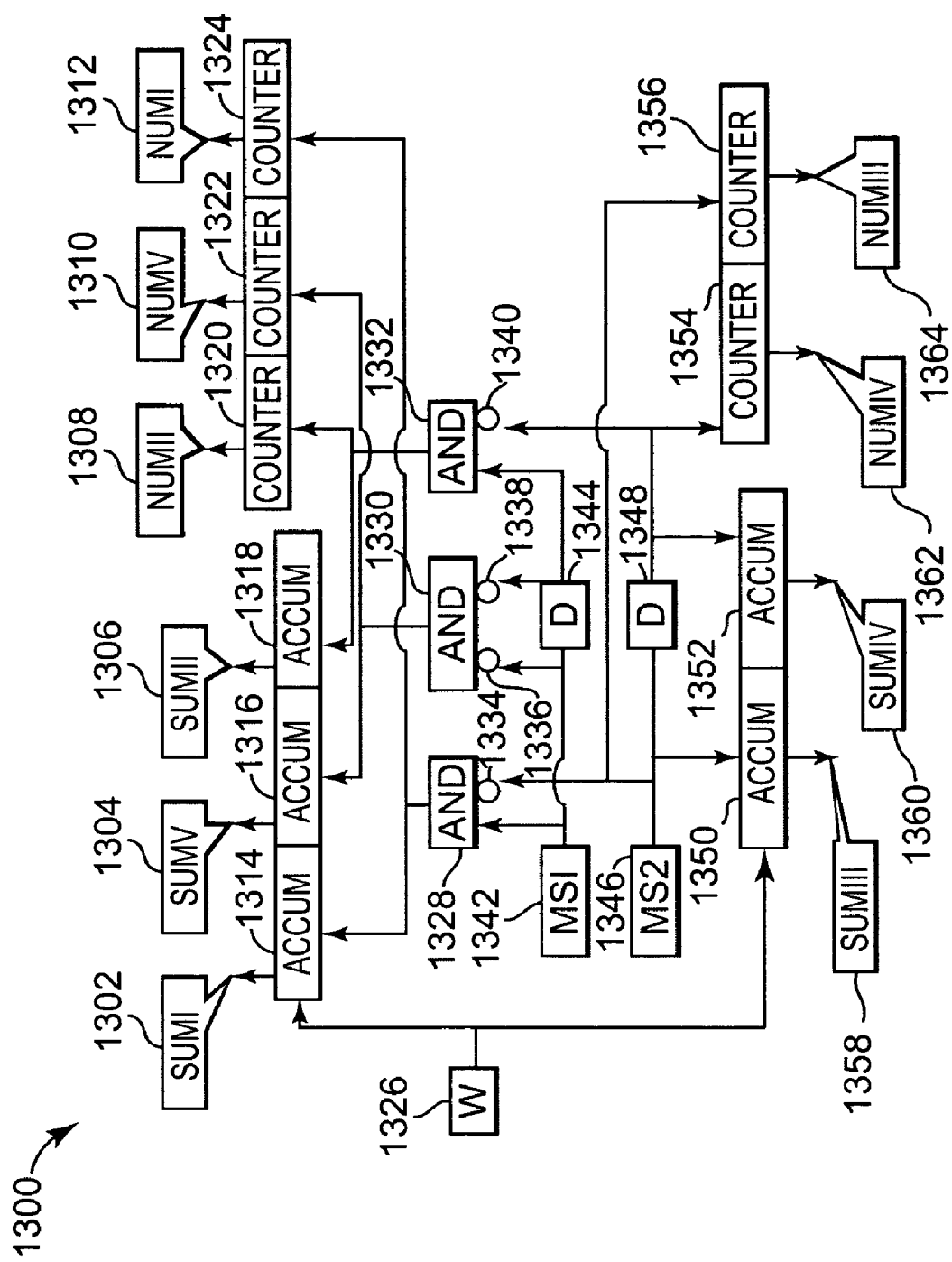
FIG. 13 is a block diagram illustrating a SUM and NUM parameter generator according to the present teachings.

In one form of the invention, the circuit shown in FIG. 13 accomplishes summing equations automatically. FIG. 13 is a block diagram illustrating a SUM and NUM parameter generator 1300 in an embodiment according to the present teachings. In one embodiment, parameter generator 1300 is part of the fine position data generator 612 (FIG. 6). Parameter generator 1300 includes five accumulators 1314, 1316, 1318, 1350, and 1352; five counters 1320, 1322, 1324, 1354, and 1356; three AND gates 1328, 1330, and 1332; four inverters 1334, 1336, 1338, and 1340 at inputs of the AND gates; and two delay (D) elements 1344 and 1348.

The inputs to the parameter generator 1300 include the non-zero-mean windage vector 1326 (W), and the two 17-bit selected binary target vectors 1342 and 1346 (MS1 and MS2). The outputs of the parameter generator 1300 include five sums 1302, 1304, 1306, 1358, and 1360 (also referred to herein as SUMI, SUMV, SUMII, SUMIII, and SUMIV, respectively), and five numbers or "nums" 1308, 1310, 1312, 1362, and 1364 (also referred to herein as NUMII, NUMV, NUMI, NUMIV, and NUM III, respectively).

The windage vector 1326 (W) is shifted into each of the five accumulators 1314, 1316, 1318, 1350, and 1352. The 17 bits of each of the selected binary target vectors 1342 and 1346 (MS1 and MS2) are simultaneously shifted into parameter generator 1300. Two sequential elements of each vector 1342 and 1346 at any given time are separated by delay elements 1344 and 1348, respectively. During each clock cycle, there are four bits of vectors 1342 and 1346 (MS1 and MS2) in view: MS1(j), MS1(j−1), MS2(j), MS2(j−1); where j is an index for identifying a bit of the selected binary target vectors 1342 and 1346 (MS1 and MS2). The index, j, runs a length of sixteen clocks, starting with a value determined by the coarse position data generator 610. Logic combinations of the four bits in view identify a transition type (e.g., grey to white, white to grey, grey to black, black to grey, or grey to grey), and selectively enable and disable clocks of the five accumulators 1314, 1316, 1318, 1350, and 1352, and five counters 1320, 1322, 1324, 1354, and 1356, to generate a total of ten values 1302, 1304, 1306, 1358, 1360, 1308, 1310, 1312, 1362, and 1364.

The AND gate 1328 receives MS1(j) and inverted-MS2 (j), and enables accumulator 1314 and counter 1324 when the output of the AND gate 1328 is high (corresponding to a first transition type). The AND gate 1330 receives inverted-MS1(j) and inverted-MS1(j−1), and enables accumulator 1316 and counter 1322 when the output of the AND gate 1330 is high (corresponding to a fifth transition type). The AND gate 1332 receives MS1(j−1) and inverted-MS2 (j−1), and enables accumulator 1318 and counter 1320 when the output of the AND gate 1332 is high (corresponding to a second transition type). Accumulator 1352 and counter 1354 are enabled when MS2(j−1) is high (corresponding to a fourth transition type). Accumulator 1350 and counter 1356 are enabled when MS2(j) is high (corresponding to a third transition type).

The following Table II illustrates the five possible types of left-to-right pixel transitions I through V, and the corresponding logical enabling equations for the transitions:

TABLE II

| Type | Transition | Logical Enabling Equation |
|---|---|---|
| I | g to w | Type I Enable = MS1(j) AND NOT MS2(j) |
| II | w to g | Type II Enable = MS1(j − 1) AND NOT MS2(j − 1) |
| III | g to b | Type III Enable = MS2(j) |
| IV | b to g | Type IV Enable = MS2(j − 1) |
| V | g to g | Type V Enable = NOT MS1(j) AND NOT MS1(j − 1) |

The five types of transitions shown in Table II enable the clocks of the five counters 1320, 1322, 1324, 1354, and 1356, to generate five numbers 1308, 1310, 1312, 1362, and 1364, respectively. The same transitions enable the clocks of the five accumulators 1314, 1316, 1318, 1350, and 1352, to accumulate elements of the windage vector 1326 (W), and thereby generate five sums 1302, 1304, 1306, 1358, and 1360, respectively.

The zero-mean windage vector ($W_z$) could also be used in generator 1300 in place of the windage vector (W). To generate the NUM and SUM parameters 1308, 1310, 1312, 1362, 1364, 1302, 1304, 1306, 1358, and 1360 for elevation, the windage vector 1326 (W) is replaced with the elevation vector (V) or the zero-mean elevation vector ($V_z$). The above description assumes that the 55×55-pixel target 106A (FIG. 3) is being used. For the 711×711-pixel target 106B (FIG.

4A), the same circuit 1300 may be used, except the running index, j, spans 32 values exhausting the 32-elements of the windage vector 1326 (W). The operation of parameter generator 1300 in generating the five SUM parameters 1302, 1304, 1306, 1358, and 1360, and the five NUM parameters 1308, 1310, 1312, 1362, and 1364, in an embodiment according to the present teachings, is represented in computer pseudo code by the following Pseudo Code Example I:

PSEUDO CODE EXAMPLE I

```
For i=1 to 32
  if Type(i)=I, SumI=SumI+W(i)
    NumI=NumI+1
  if Type(i)=II, SumII=SumII+W(i)
    NumII=NumII+1
  if Type(i)=III, SumIII=SumIII+W(i)
    NumIII=NumIII+1
  if Type(i)=IV, SumIV=SumIV+W(i)
    NumIV=NumIV+1
  if Type(i)=V, SumV=SumV+W(i)
    NumV=NumV+1
End loop i
```

Figure 14:
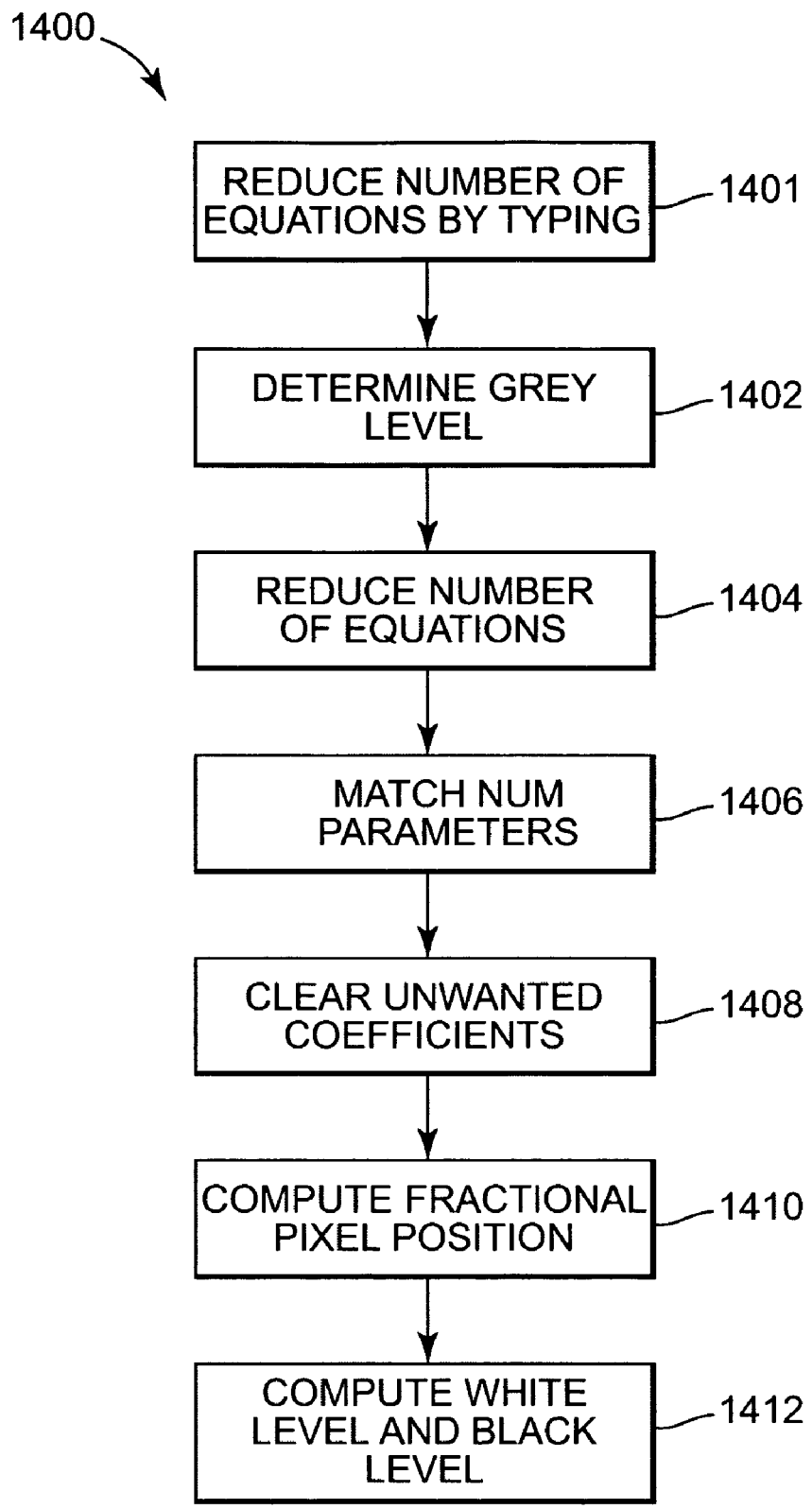
FIG. 14 is a flow diagram illustrating a method for determining fractional pixel location according to the present teachings.

Fine position data generator 612 determines the fractional pixel location, $\lambda$, from the five NUM and five SUM parameters 1308, 1310, 1312, 1362, 1364, 1302, 1304, 1306, 1358, and 1360, generated by parameter generator 1300. FIG. 14 is a flow diagram illustrating a method 1400 according to the present teachings for determining a fractional pixel location, $\lambda$. In one embodiment, fine position data generator 612 is configured to perform method 1400.

At 1401 in method 1400, the sixteen equations defined by Equation XIII above are reduced to five equations (Equation XIV) by summing equations of the same type. The reduction of equations at 1401 is performed by the parameter generator circuit 1300 shown in FIG. 13. In the specific example, the equations are reduced by hardware "typing".

At 1402 in method 1400, which is referred to as a "grey" step, fine position data generator 612 determines the unknown grey-level, g, in Equation XIV. In one embodiment, generator 612 establishes the unknown grey-level, g, based on the following Equation XV:

$$g = SUMV/NUMV \qquad \text{Equation XV}$$

The divisor in Equation XV according to one embodiment will be 2, 3, 4, 5, 6, 7, or 8.

At 1404, which is referred to as an "even-up" step, using the value for the grey-level, g, determined at 1402, fine position data generator 612 reduces the five equations defined in Equation XIV above to four equations. In one embodiment, the four equations are given by the following Equations XVI–XIX:

$$SUMI = SUMI - g \cdot NUMI \qquad \text{Equation XVI}$$

$$SUMII = SUMII - g \cdot NUMII \qquad \text{Equation XVII}$$

$$SUMIII = SUMIII - g \cdot NUMIII \qquad \text{Equation XVIII}$$

$$SUMIV = SUMII - g \cdot NUMIV \qquad \text{Equation XIX}$$

At 1406, which is referred to as a "matching" step, fine position data generator 612 makes NUMI equal NUMII, and NUMIII equal NUMIV, as shown in the following Pseudo Code Example II:

PSEUDO CODE EXAMPLE II

```
If NUMI>NUMII
    SUMII=SUMII·(NUMI/NUMII),
    NUMII=NUMII+1,
End if;
If NUMII>NUMI
    SUMI=SUMI·(NUMII/NUMI),
    NUMI=NUMI+1,
End if;
If NUMIII>NUMIV
    SUMIV=SUMIV·(NUMIII/NUMIV),
    NUMIV=NUMIV+1,
End if;
If NUMIV>NUMIII
    SUMIII=SUMIII·(NUMIV/NUMIII),
    NUMIII=NUMIII+1,
End if;
```

At 1408, which is referred to as an "isolating" step, fine position data generator 612 clears unwanted coefficients in the matrix corresponding to Equation XIV based on the following Equations XX and XXI:

$$SUMII = SUMI + SUMII \qquad \text{Equation XX}$$

$$SUMIV = SUMIII + SUMIV \qquad \text{Equation XXI}$$

At 1410, which is referred to as a "lambda" step, fine position data generator 612 computes the fractional pixel position, $\lambda$, as shown in the following Equation XXII:

$$\lambda = (SUMI - SUMIII)/(SUMII - SUMIV) \qquad \text{Equation XXII}$$

At 1412, which is referred to as a "light intensities" step, fine position data generator 612 computes the remaining unknown light levels, w and b, in Equation XIV. The determination of these light levels is not necessary for location interpolation, but can be accomplished using the now-known fractional pixel position, $\lambda$, (determined from Equation XXII) and the latest updated numbers, as shown in the following Equations XXIII and XXIV:

$$w = g + \frac{SumI + SumII}{(1+\lambda) \cdot NumI} \qquad \text{Equation XXIII}$$

$$b = g + \frac{SumIII + SumIV}{(1+\lambda) \cdot NumIII} \qquad \text{Equation XXIV}$$

In summary, in a specific embodiment according to the present teachings, every captured image 312 can be reduced to the form given in the following Equation XXV (with ten known numbers SUMI–SUMV and NUMI–NUMV) and four unknowns ($\lambda$, g, w, and b):

$$\begin{aligned}[SUMI, SUMII, SUMIII, SUMIV, SUMV] = \\ (1-\lambda) \cdot [NUMI \cdot g, NUMII \cdot w, NUMIII \cdot g, \\ NUMIV \cdot b, NUMV \cdot g] + \lambda \cdot [NUMI \cdot w, \\ NUMII \cdot g, NUMIII \cdot b, NUMIV \cdot g, NUMV \cdot g]\end{aligned} \qquad \text{Equation XXV}$$

where:
  SUMI=value of parameter 1302 generated by parameter generator 1300;
  SUMII=value of parameter 1306 generated by parameter generator 1300;

SUMIII=value of parameter 1358 generated by parameter generator 1300;
SUMIV=value of parameter 1360 generated by parameter generator 1300;
SUMV=value of parameter 1304 generated by parameter generator 1300;
NUMI=value of parameter 1312 generated by parameter generator 1300;
NUMII=value of parameter 1308 generated by parameter generator 1300;
NUMIII=value of parameter 1364 generated by parameter generator 1300;
NUMIV=value of parameter 1362 generated by parameter generator 1300;
NUMV=value of parameter 1310 generated by parameter generator 1300;
$\lambda$=fractional pixel location;
w=unknown sensor recording for a white pixel;
g=unknown sensor recording for a grey pixel; and
b=unknown sensor recording for a black pixel.

Equation XXV is applicable to either the windage dimension or the elevation dimension. In matrix notation, the equation set corresponding to Equation XXV is given in the following Equation XXVI:

$$\begin{bmatrix} SumI \\ SumII \\ SumIII \\ SumIV \\ SumV \end{bmatrix} = \begin{bmatrix} 0 & NumI & 0 & NumI & -NumI & 0 \\ NumII & 0 & 0 & -NumII & NumII & 0 \\ 0 & NumII & 0 & 0 & -NumIII & NumIII \\ 0 & 0 & NumIV & 0 & NumIV & -NumIV \\ 0 & NumV & 0 & 0 & 0 & 0 \end{bmatrix} \cdot \begin{bmatrix} w \\ g \\ b \\ \lambda w \\ \lambda g \\ \lambda b \end{bmatrix} \quad \text{Equation XXVI}$$

In one embodiment, fine position data generator 612 performs method 1400 to solve all four unknowns from the set of five equations defined in Equation XXVI.

FIG. 15 is a diagram illustrating the determination of a fractional pixel location, $\lambda$, for an example windage vector (W) using the embodiment of the method 1400 shown in FIG. 14. It will be assumed that the example windage vector (W) starts with the first white pixel to the right of the center portion 316A (ccc) of the target 106A, with a small offset of 0.05. A noise term of 0.25 RMS is also added to the example windage vector (W). The windage vector (W) is given by the following Equation XXVII:

W=0.95·[15,8,1,8,8,15,8,1,8,8,8,8,8,15,8,1]+0.05·
[8,1,8,8,15,8,1,8,8,8,8,8,15,8,1,8]+noise   Equation XXVII Based on windage vector (W) given in Equation XXVII above, parameter generator 1300 will generate the five SUM values and the five NUM values given in the first two columns of table 1502A in FIG. 15. The third through the eighth columns of table 1502A correspond to the matrix given above in Equation XXVI. Thus, using the NUM values in the second column of table 1502A, the third through the eighth columns of table 1502A are completed as defined by the matrix in Equation XXVI. The word "unmatched" appears on the right side of the table 1502A in rows I and II, which indicates that NUMI does not match (i.e., is not equal to) NUMII. The word "matched" appears on the right side of the table 1502A in rows III and IV, which indicates that NUMIII matches NUMIV. In one embodiment, unmatched NUM values are modified to become matched NUM values, as described in further detail below.

During the performance of method 1400, some values in table 1502A change, and other values in table 1502A remain the same. The changes to table 1502A are shown by tables 1502B, 1502C, and 1502D (tables 1502A–1502D are collectively referred to herein as tables 1502). As shown in FIG. 15, values that are changed from one table 1502 to the next are encircled, and values that are not changed from the values in the previous table 1502 are not.

At 1402 in method 1400, fine position data generator 612 determines the unknown grey-level, g, in Equation XIV. Using Equation XV above, the grey-level, g, is determined to be "8.01", as indicated at 1504 in FIG. 15.

At 1404 in method 1400, which is referred to as an "even-up" step, using the value for the grey-level, g, determined at 1402, fine position data generator 612 reduces the five equations defined in Equation XIV above to four equations. The four equations are given by the above Equations XVI–XIX. Based on the Equations XVI–XIX, the SUM values are modified to the values shown in the first column of table 1502B, and the fifth row of the table is removed. The values appearing in the fourth column of table 1502B are also changed from the values appearing in the previous table 1502A. The word "even" appears on the right side of table 1502B, in rows I–IV, which indicates that the "even-up" step 1404 has been performed.

At 1406 in method 1400, which is referred to as a "matching" step, fine position data generator 612 ensures NUMI equal NUMII, and NUMIII equal NUMIV, as shown in the above Pseudo Code Example II. After the matching step, the values for SUMI and NUMI are changed as indicated in table 1502C, and the values in the sixth and seventh columns of the first row are also changed. The word "matched" on the right side of the table 1502C in row I indicates that NUMI now matches NUMII.

At 1408 in method 1400, which is referred to as an "isolating" step, fine position data generator 612 clears unwanted coefficients in the matrix given in Equation XXVI based on the above Equations XX and XXI. After the isolating step, the values for SUMII and SUMIV are changed as indicated in table 1502D. The values in the sixth and seventh columns of the second row, and the values in the seventh and eighth columns of the fourth row are also changed. The word "isolated" on the right side of the table 1502D in rows II and IV indicates that these two rows have been isolated, and unwanted coefficients have been cleared from these two rows.

At 1410 in method 1400, which is referred to as a "lambda" step, fine position data generator 612 computes the fractional pixel position, $\lambda$, using the above Equation XXII. Using Equation XXII above, the fractional pixel position, $\lambda$, is determined to be "0.054", as indicated at 1506 in FIG. 15. The fractional pixel position, $\lambda$, is added to the coarse location, $L_w$, to form the final windage position.

At 1412 in method 1400, which is referred to as a "light levels" step, fine position data generator 612 computes the remaining unknown light levels, w and b, using the above Equations XXIII and XXIV. Using Equations XXIII and XXIV above, the unknown light levels, w and b, are determined to be "15.07" and "1.22", respectively, as indicated at 1508 in FIG. 15. When a zero-mean vector $W_Z$ is used, $\lambda$ is not affected, but the light values will be reflected with g very near zero, and b negative.

Thus, based on the block-regression process described above, fine position data generator 612 solves the four unknowns ($\lambda$, g, w, and b) in Equation XXVI. The calculated value (0.054) for the fractional pixel position, $\lambda$, is very close to value of the assumed offset (0.05), but because of the noise that was added, the values are not identical.

Unlike some prior art techniques that use imbedded position codes to identify the position of a captured image, in one embodiment according to the present teachings, every N×N image (e.g., N>22 for a 711×711-pixel target) over the entire target is unique by design, so there is no need for such imbedded position codes, and therefore no need to search for them in the image and decipher them.

The block-regression processing that is performed in a specific embodiment according to the present teachings distills a best-fit solution over amply redundant data, effectively neutralizing residual cross-correlation effect. The tri-level (e.g., –1, 0, 1) target grey-scale in a 2-bit binary form, according to one embodiment, enables high-speed coarse and much of fine position determination, using common digital logic gates, counters, and accumulators. The modest hardware requirements of specific embodiments according to the present teachings allow economic parallel one-dimensional operation for high through-put. In one embodiment according to the present teachings, two-dimensional absolute position determinations are made without performing any two-dimensional correlations.

In one embodiment according to the present teachings, position-encoding is self-contained in each frame. As a by-product, however, the regression process measures the average grey-white-black intensities. These values may be used from one frame to another for even simpler and speedier encoding. The regression processing performed in specific embodiments according to the present teachings intelligently widens error-margins and improves precision in results, and does so with very few slower processor-intervening mathematical operations.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for sensing an absolute position in two dimensions, comprising:
   a target having a two-dimensional target pattern;
   a sensor for capturing an image of a first subset of the target pattern; and
   a controller for generating a first image vector representing summations of rows of pixel values from the image, and a second image vector representing summations of columns of pixel values from the image, the controller configured to determine an absolute two-dimensional position of the first subset with respect to an origin of the target pattern based on the first and the second image vectors and a plurality of target vectors that represent the target pattern.

2. The system of claim 1, wherein the target pattern has less than four grey levels.

3. The system of claim 2, wherein the target pattern has three grey-levels.

4. The system of claim 2, wherein the target pattern has two grey levels.

5. The system of claim 1, wherein the target pattern comprises a first plurality of parallel lines having a first grey level, and a second plurality of parallel lines having a second grey level, and wherein the first plurality of lines is parallel to the second plurality of lines.

6. The system of claim 5, wherein the target pattern comprises a third plurality of parallel lines having the first grey level, and a fourth plurality of parallel lines having the second grey level, wherein the third plurality of lines is parallel to the fourth plurality of lines, and wherein the first and the second pluralities of lines are orthogonal to the third and the fourth pluralities of lines.

7. The system of claim 6, wherein the first, second, third, and fourth pluralities of lines are formed over a background that has a third grey level.

8. The system of claim 7, wherein the first grey level is black and the second grey level is white.

9. The system of claim 6, wherein a spacing between parallel lines in the target pattern is varied.

10. The system of claim 9, wherein the target pattern is symmetrical in two dimensions about a center of the target pattern.

11. The system of claim 1, wherein the first subset is unique within the target pattern such that no other subset of the target pattern having a same size as the first subset is identical to the first subset.

12. The system of claim 1, wherein the target pattern has three grey levels, and wherein the target vectors are a system of binary vectors.

13. The system of claim 12, wherein the controller includes binary logic for processing the image vectors and the target vectors.

14. The system of claim 1, wherein the target vectors include first, second, third, and fourth target vectors.

15. The system of claim 14, wherein the controller is configured to generate a first plurality of selection values based on the first image vector and the first and the second target vectors, generate a second plurality of selection values based on the first image vector and the third and the fourth target vectors, generate a third plurality of selection values based on the second image vector and the first and the second target vectors, and generate a fourth plurality of selection values based on the second image vector and the third and the fourth target vectors.

16. The system of claim 15, wherein the controller is configured to determine a coarse absolute position of the first subset with respect to the origin in a first dimension based on a comparison of the first and the second pluralities of selection values, and determine a coarse absolute position of the first subset with respect to the origin in a second dimension based on a comparison of the third and the fourth pluralities of selection values.

17. The system of claim 1, wherein the controller includes a plurality of accumulators for selectively accumulating elements of the first image vector and the second image vector, thereby generating a plurality of sums, and a plurality of counters for generating a plurality of numbers.

18. The system of claim 17, wherein the accumulators and the counters are controlled by selected portions of the target vectors, the selected portions corresponding to a coarse absolute two-dimensional position of the first subset with respect to the origin.

19. The system of claim 18, wherein the controller is configured to determine a fine absolute two-dimensional position of the first subset with respect to the origin based on the plurality of sums and the plurality of numbers.

20. The system of claim 1, wherein the controller is configured to determine the absolute two-dimensional position of the first subset based on two independent one-dimensional processes.

21. A method of determining a position of an object, the method comprising:
providing a two-dimensional target pattern on the object;
capturing an image of a first portion of the target pattern;
generating a first image vector representing summations of rows of pixel values from the image;
generating a second image vector representing summations of columns of pixel values from the image;
generating a first set of position data representing an absolute two-dimensional position of the first portion, the first set of position data generated based on the first and the second image vectors and a plurality of target sequences that represent the target pattern;
generating a second set of position data representing an absolute two-dimensional position of the object, the second set of position data generated based on the first set of position data; and
outputting the first and second sets of position data.

22. The method of claim 21, wherein the two-dimensional target pattern includes a background having a first grey level, and a plurality of orthogonal lines with varied spacing between lines formed on the background, the plurality of orthogonal lines including a first subset of lines having a second grey level, and a second subset of lines having a third grey level.

23. The method of claim 21, wherein the plurality of target sequences includes first, second, third, and fourth binary target sequences, the method further comprising:
generating a first plurality of values based on the first image vector and the first and the second binary target sequences;
generating a second plurality of values based on the first image vector and the third and the fourth binary target sequences;
generating a third plurality of values based on the second image vector and the first and the second binary target sequences; and
generating a fourth plurality of values based on the second image vector and the third and the fourth binary target sequences.

24. The method of claim 23, and further comprising:
determining a coarse absolute position of the first portion in a first dimension based on a comparison of the first and the second pluralities of values; and
determining a coarse absolute position of the first portion in a second dimension based on a comparison of the third and the fourth pluralities of values.

25. The method of claim 21, and further comprising:
selectively accumulating elements of the first image vector and the second image vector based on selected subsets of the target sequences, thereby generating a plurality of sums; and
generating a plurality of numbers by selectively enabling and disabling counters based on selected subsets of the target sequences.

26. The method of claim 25, wherein the selected subsets of the target sequences correspond to a coarse absolute two-dimensional position of the first portion, the method further comprising:
determining a fine absolute two-dimensional position of the first portion based on the plurality of sums and the plurality of numbers.

27. A target for use in determining an absolute two-dimensional position of an object with respect to the target, the target comprising:
a base surface;
a two-dimensional target pattern having less than four grey levels formed on the base surface, the target pattern including a background of a first grey level and a plurality of orthogonal lines with non-constant spacing between lines formed on the background, the plurality of orthogonal lines including a first subset of lines of a second grey level, and a second subset of lines of a third grey level; and
wherein the target pattern is configured such that an absolute two dimensional position of an object can be determined based on a captured image of a subset of the target pattern.

28. The target of claim 27, wherein the second grey level is black, and the third grey level is white.

29. The target of claim 27, wherein the target pattern is symmetrical in two dimensions about a center of the target pattern.

* * * * *